US009209706B2

(12) United States Patent
Takahagi et al.

(10) Patent No.: US 9,209,706 B2
(45) Date of Patent: Dec. 8, 2015

(54) SWITCHING RECTIFIER CIRCUIT AND BATTERY CHARGER USING SAME

(75) Inventors: Tsutomu Takahagi, Kyoto (JP);
Kenichi Niiyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 276 days.

(21) Appl. No.: 13/883,626

(22) PCT Filed: Nov. 11, 2011

(86) PCT No.: PCT/JP2011/076023
§ 371 (c)(1),
(2), (4) Date: May 6, 2013

(87) PCT Pub. No.: WO2012/067024
PCT Pub. Date: May 24, 2012

(65) Prior Publication Data
US 2013/0235635 A1    Sep. 12, 2013

(30) Foreign Application Priority Data

Nov. 19, 2010   (JP) .................................. 2010-259304
Apr. 18, 2011   (JP) .................................. 2011-092339
Aug. 11, 2011   (JP) .................................. 2011-176233

(51) Int. Cl.
*H02M 7/219*         (2006.01)
*H02J 7/02*          (2006.01)

(52) U.S. Cl.
CPC ............... *H02M 7/219* (2013.01); *H02J 7/022* (2013.01); *H02M 2007/2195* (2013.01)

(58) Field of Classification Search
CPC .............. H02M 7/2195; H02M 7/219; H02M 2001/0051; H02M 7/797; H02M 2007/2195
See application file for complete search history.

(56) References Cited

U.S. PATENT DOCUMENTS 6,324,084 B1   11/2001  Fujisawa
6,327,164 B1   12/2001  Shinkawa
6,373,790 B1 *  4/2002  Fujisawa ........................ 368/204
(Continued)

FOREIGN PATENT DOCUMENTS

CN    1208511 A    2/1999
CN    1272235 A    11/2000
(Continued)

OTHER PUBLICATIONS

Japanese Patent Office, International Search Report for International Application PCT/JP2011/076023 (Jan. 24, 2012).

*Primary Examiner* — Harry Behm
(74) *Attorney, Agent, or Firm* — Fish & Richardson P.C.

(57) ABSTRACT

A switching rectifier circuit according to the present invention includes: a first switch coupled between a first alternating-current voltage and a direct-current voltage; a second switch coupled between a second alternating-current voltage and the direct-current voltage; a third switch coupled between the first alternating-current voltage and a reference voltage; a fourth switch coupled between the second alternating-current voltage and the reference voltage; a first comparator circuit that generates each of a first power-on detection signal and a first power-off detection signal from the first alternating-current voltage and the direct-current voltage; a second comparator circuit that generates each of a second power-on detection signal and a second power-off detection signal from the second alternating-current voltage and the direct-current voltage; and a timing generator that controls the switches to be turned on/off on the basis of outputs of at least the comparator circuits.

18 Claims, 19 Drawing Sheets

(56) References Cited

U.S. PATENT DOCUMENTS

| | | | |
|---|---|---|---|
| 6,421,261 B1 | 7/2002 | Fujisawa et al. | |
| 8,913,409 B2* | 12/2014 | Hui et al. | 363/127 |
| 2003/0095423 A1* | 5/2003 | Hirst | 363/127 |
| 2006/0187686 A1 | 8/2006 | Sun | |
| 2007/0170903 A1* | 7/2007 | Apfel | 323/282 |
| 2009/0016090 A1 | 1/2009 | Knight | |
| 2011/0234157 A1 | 9/2011 | Knight | |

FOREIGN PATENT DOCUMENTS

| | | |
|---|---|---|
| CN | 1289476 A | 3/2001 |
| CN | 1304202 A | 7/2001 |
| JP | 9-131064 | 5/1997 |
| JP | 2002-152967 | 5/2002 |
| JP | 2010-074950 | 4/2010 |
| TW | 200631313 | 9/2006 |
| TW | 200910749 A | 3/2009 |

\* cited by examiner

SWITCHING RECTIFIER CIRCUIT AND BATTERY CHARGER USING SAME

TECHNICAL FIELD

The present invention relates to switching rectifier circuits, and to battery chargers using them.

BACKGROUND ART

Conventionally, as a means of rectifying an AC voltage VAC into a DC voltage VDC, a full-wave rectification circuit 100 using a diode bridge as shown in FIG. 19 is commonly used. Inconveniently, however, the diodes 101 to 104 constituting the diode bridge have a high forward voltage drop, which causes energy loss (power loss or heat generation in the diodes 101 to 104) during the periods in which current I passes through the diodes 101 to 104 (see the hatched areas in FIG. 20).

As an improvement, there has conventionally been proposed a switching rectifier circuit 200 in which, as shown in FIG. 21, diodes 101 to 104 as mentioned above are replaced with transistors 201 to 204, which are turned on and off with proper timing so as to convert an AC voltage VAC into a DC voltage VDC.

In this switching rectifier circuit 200, the timing with which the turning on and off of the transistor 201 is controlled is determined based on the comparison output from a comparator 206 (an output resulting from comparison between the DC voltage VDC and a first AC voltage VAC1); the timing with which the turning on and off of the transistor 202 is controlled is determined based on the comparison output from a comparator 207 (an output resulting from comparison between the DC voltage VDC and a second AC voltage VAC2). Moreover, the timing with which the turning on and off of the transistor 203 is controlled is determined based on the comparison output from a comparator 208 (an output resulting from comparison between the reference voltage VSS and the first AC voltage VAC1); the timing with which the turning on and off of the transistor 204 is controlled is determined based on the comparison output from a comparator 209 (an output resulting from comparison between the reference voltage VSS and the second AC voltage VAC1).

Examples of technologies related to what has been discussed above are found in Patent Documents 1 and 2 listed below.

LIST OF CITATIONS

Patent Literature

Patent Document 1: Japanese Patent Application Publication No. H9-131064
Patent Document 2: United States Patent Application Publication No. 2009/0016090

SUMMARY OF THE INVENTION

Technical Problem

Inconveniently, with the conventional switching rectifier circuit 200 configured as described above, it is difficult to accurately control the timing with which the transistors 201 to 204 are turned on and off. Consequently, the transistors 201 and 204 (or 202 and 203) cannot be turned off reliably before the first AC voltage VAC1 (or the second AC voltage VAC2) decreases under the DC voltage VDC, and this may cause a reverse-flow current from an output capacitor 205, leading to diminished power conversion efficiency (see FIG. 22).

In view of the above-discussed inconveniences found out by its inventors, the present invention aims to provide a switching rectifier circuit that contributes to higher power conversion efficiency, and to provide a battery charger employing such a switching rectifier circuit.

Problem to be Solved by the Invention

To achieve the above object, according to one aspect of the invention, a switching rectification circuit includes: a first switch connected between a terminal to which a first AC voltage is applied and a terminal to which a DC voltage is applied; a second switch connected between a terminal to which a second AC voltage is applied and the terminal to which the DC voltage is applied; a third switch connected between the terminal to which the first AC voltage is applied and a terminal to which a reference voltage is applied; a fourth switch connected between the terminal to which the second AC voltage is applied and the terminal to which the reference voltage is applied; a first comparison circuit adapted to generate from the first AC voltage and the DC voltage a first on detection signal and a first off detection signal individually; a second comparison circuit adapted to generate from the second AC voltage and the DC voltage a second on detection signal and a second off detection signal individually; and a timing generator adapted to control the turning on and off of the first to fourth switches based on at least the outputs of the first and second comparison circuits (a first configuration).

In the switching rectifier circuit of the first configuration described above, preferably, the first comparison circuit includes: a first hysteresis comparator adapted to turn the first on detection signal to high level or low level when the first AC voltage increases over a first threshold voltage higher than the DC voltage and turn the first on detection signal to low level or high level when the first AC voltage decreases under a third threshold voltage lower than the DC voltage; and a first comparator adapted to turn the first off detection signal to high level or low level when the first AC voltage increases over a second threshold voltage higher than the DC voltage but lower than the first threshold voltage and turn the first off detection signal to low level or high level when the first AC voltage decreases under the second threshold voltage. Moreover, preferably, the second comparison circuit includes: a second hysteresis comparator adapted to turn the second on detection signal to high level or low level when the second AC voltage increases over the first threshold voltage and turn the second on detection signal to low level or high level when the second AC voltage decreases under the third threshold voltage; and a second comparator adapted to turn the second off detection signal to high level or low level when the second AC voltage increases over the second threshold and turn the second off detection signal to low level or high level when the second AC voltage decreases under the second threshold voltage (a second configuration).

In the switching rectifier circuit of the second configuration described above, preferably, there are further provided: a third comparison circuit adapted to generate from the first AC voltage and the reference voltage a third detection signal; and a fourth comparison circuit adapted to generate from the second AC voltage and the reference voltage a fourth detection signal. Here, preferably, the timing controller is adapted to control the turning on and off of the first to fourth switches based on at least the outputs of the first to fourth comparison circuits (a third configuration).

In the switching rectifier circuit of the third configuration described above, preferably, the third comparison circuit includes a third hysteresis comparator adapted to turn the third detection signal to high level or low level when the first AC voltage decreases under a fourth threshold voltage lower than the reference voltage and turn the third detection signal to low level or high level when the first AC voltage increases over a fifth threshold voltage higher than the reference voltage, and the fourth comparison circuit includes a fourth hysteresis comparator adapted to turn the fourth detection signal to high level or low level when the second AC voltage decreases under the fourth threshold voltage and turn the fourth detection signal to low level or high level when the second AC voltage increases over the fifth threshold voltage (a fourth configuration).

In the switching rectifier circuit of the fourth configuration described above, preferably, there is further provided a time constant circuit adapted to generate an enable signal which remains at high level or low level after the first or second AC voltage increases over the first threshold voltage until a predetermined time elapses. Here, preferably, the timing controller is adapted to control the turning on and off of the first to fourth switches based on at least the outputs of the first to fourth comparison circuits and of the time constant circuit (a fifth configuration).

In the switching rectifier circuit of the fifth configuration described above, preferably, the predetermined time is controlled to vary so as to be the shorter the higher the voltage level of the DC voltage is (a sixth configuration).

In the switching rectifier circuit of the fourth configuration described above, preferably, the timing generator is adapted to generate the first on and off control signals so as to turn on the first switch when the first AC voltage increases over the first threshold voltage and turn off the first switch when the first AC voltage decreases under the second threshold voltage, generate the second on and off control signals so as to turn on the second switch when the second AC voltage increases over the first threshold voltage and turn off the second switch when the second AC voltage decreases under the second threshold voltage, generate the third on and off control signals so as to turn on the third switch a first wait time after the first AC voltage decreases under the fourth threshold voltage and turn off the third switch when the second AC voltage decreases under the fourth threshold voltage, and generate the fourth on and off control signals so as to turn on the fourth switch a second wait time after the second AC voltage decreases under the fourth threshold voltage and turn off the fourth switch when the first AC voltage decreases under the fourth threshold voltage (a seventh configuration).

In the switching rectifier circuit of the fifth or sixth configuration described above, preferably, the timing generator is adapted to generate the first on and off control signals so as to turn on the first switch when the first AC voltage increases over the first threshold voltage and turn off the first switch when the first AC voltage decreases under the second threshold voltage or a predetermined time after the first AC voltage has increased over the first threshold voltage, generate the second on and off control signals so as to turn on the second switch when the second AC voltage increases over the first threshold voltage and turn off the second switch when the second AC voltage decreases under the second threshold voltage or a predetermined time after the second AC voltage has increased over the first threshold voltage, generate the third on and off control signals so as to turn on the third switch a first wait time after the first AC voltage decreases under the fourth threshold voltage and turn off the third switch when the second AC voltage decreases under the fourth threshold voltage, and generate the fourth on and off control signals so as to turn on the fourth switch a second wait time after the second AC voltage decreases under the fourth threshold voltage and turn off the fourth switch when the first AC voltage decreases under the fourth threshold voltage (an eighth configuration).

In the switching rectifier circuit of the fourth configuration described above, preferably, the timing generator is adapted to generate the first on and off control signals so as to turn on the first switch when the first AC voltage increases over the first threshold voltage and turn off the first switch when the first AC voltage decreases under the second threshold voltage, generate the second on and off control signals so as to turn on the second switch when the second AC voltage increases over the first threshold voltage and turn off the second switch when the second AC voltage decreases under the second threshold voltage, generate the third on and off control signals so as to turn on the third switch when the first AC voltage decreases under the fourth threshold voltage and turn off the third switch when the second AC voltage decreases under the second threshold voltage, and generate the fourth on and off control signals so as to turn on the fourth switch when the second AC voltage decreases under the fourth threshold voltage and turn off the fourth switch when the first AC voltage decreases under the second threshold voltage (a ninth configuration).

In the switching rectifier circuit of the fourth configuration described above, preferably, the timing generator is adapted to generate the first on and off control signals so as to turn on the first switch when the first AC voltage increases over the first threshold voltage and turn off the first switch when the first AC voltage decreases under the second threshold voltage, generate the second on and off control signals so as to turn on the second switch when the second AC voltage increases over the first threshold voltage and turn off the second switch when the second AC voltage decreases under the second threshold voltage, generate the third on and off control signals so as to turn on the third switch when the second AC voltage increases over the first threshold voltage and turn off the third switch when the second AC voltage decreases under the fourth threshold voltage, and generate the fourth on and off control signals so as to turn on the fourth switch when the first AC voltage increases over the first threshold voltage and turn off the fourth switch when the first AC voltage decreases under the fourth threshold voltage (a tenth configuration).

In the switching rectifier circuit of the second configuration described above, preferably, the timing generator is adapted to generate the first and fourth on and off control signals so as to turn on both the first and fourth switches when the first AC voltage increases over the first threshold voltage and turn off both the first and fourth switches when the first AC voltage decreases under the second threshold voltage, and generate the second and third on and off control signals so as to turn on both the second and third switches when the second AC voltage increases over the first threshold voltage and turn off both the second and third switches when the second AC voltage decreases under the second threshold voltage (an eleventh configuration).

In the switching rectifier circuit of any one of the seventh to eleventh configurations described above, preferably, the timing generator is adapted to ignore a drop in the first and second AC voltages under the second threshold voltage when turning on the first and second switches respectively (a twelfth configuration).

According to another aspect of the invention, switching rectification circuit includes: a first switch connected between a terminal to which a first AC voltage is applied and a terminal to which a DC voltage is applied; a second switch connected between a terminal to which a second AC voltage is applied and the terminal to which the DC voltage is applied; a third switch connected between the terminal to which the first AC voltage is applied and a terminal to which a reference voltage is applied; a fourth switch connected between the terminal to which the second AC voltage is applied and the terminal to which the reference voltage is applied; a first comparison circuit adapted to generate from the first AC voltage and the DC voltage a first detection signal; a second comparison circuit adapted to generate from the second AC voltage and the DC voltage a second detection signal; a third comparison circuit adapted to generate from the first AC voltage and the reference voltage a third detection signal; a fourth comparison circuit adapted to generate from the second AC voltage and the reference voltage a fourth detection signal; and a timing generator adapted to control the turning on and off of the first to fourth switches based on at least the outputs of the first to fourth comparison circuits (a thirteenth configuration).

In the switching rectifier circuit of the thirteenth configuration described above, preferably, the first comparison circuit includes a first hysteresis comparator adapted to turn the first detection signal to high level or low level when the first AC voltage increases over a first threshold voltage higher than the DC voltage and turn the first detection signal to low level or high level when the first AC voltage decreases under a second threshold voltage higher than the DC voltage but lower than the first threshold voltage, the second comparison circuit includes a second hysteresis comparator adapted to turn the second detection signal to high level or low level when the second AC voltage increases over the first threshold voltage and turn the second detection signal to low level or high level when the second AC voltage decreases under the second threshold voltage, the third comparison circuit includes a third hysteresis comparator adapted to turn the third detection signal to high level or low level when the first AC voltage decreases under a third threshold voltage lower than the reference voltage and turn the third detection signal to low level or high level when the first AC voltage increases over a fourth threshold voltage higher than the reference voltage, and the fourth comparison circuit includes a fourth hysteresis comparator adapted to turn the fourth detection signal to high level or low level when the second AC voltage decreases under the third threshold voltage and turn the fourth detection signal to low level or high level when the second AC voltage increases over the fourth threshold voltage (a fourteenth configuration).

In the switching rectifier circuit of the thirteenth configuration described above, preferably, the first comparison circuit includes a first hysteresis comparator adapted to turn the first detection signal to high level or low level when the first AC voltage increases over a first threshold voltage higher than the DC voltage and turn the first detection signal to low level or high level when the first AC voltage decreases under a second threshold voltage lower than the DC voltage, the second comparison circuit includes a second hysteresis comparator adapted to turn the second detection signal to high level or low level when the second AC voltage increases over the first threshold voltage and turn the second detection signal to low level or high level when the second AC voltage decreases under the second threshold voltage, the third comparison circuit includes a third hysteresis comparator adapted to turn the third detection signal to high level or low level when the first AC voltage decreases under a third threshold voltage lower than the reference voltage and turn the third detection signal to low level or high level when the first AC voltage increases over a fourth threshold voltage higher than the reference voltage, and the fourth comparison circuit includes a fourth hysteresis comparator adapted to turn the fourth detection signal to high level or low level when the second AC voltage decreases under the third threshold voltage and turn the fourth detection signal to low level or high level when the second AC voltage increases over the fourth threshold voltage (a fifteenth configuration).

In the switching rectifier circuit of the fourteenth or fifteenth configuration described above, preferably, there is further provided a time constant circuit adapted to generate a mask signal which remains at high level or low level after the first or second AC voltage increases over the first threshold voltage until a predetermined time elapses. Here, preferably, the timing controller is adapted to control the turning on and off of the first to fourth switches based on at least the outputs of the first to fourth comparison circuits and of the time constant circuit (a sixteenth configuration).

In the switching rectifier circuit of the sixteenth configuration described above, preferably, the predetermined time is controlled to vary so as to be the shorter the higher the voltage level of the DC voltage is (a seventeenth configuration).

In the switching rectifier circuit of the fourteenth or fifteenth configuration described above, preferably, the timing generator is adapted to generate the first on and off control signals so as to turn on the first switch when the first AC voltage increases over the first threshold voltage and turn off the first switch when the first AC voltage decreases under the second threshold voltage, generate the second on and off control signals so as to turn on the second switch when the second AC voltage increases over the first threshold voltage and turn off the second switch when the second AC voltage decreases under the second threshold voltage, generate the third on and off control signals so as to turn on the third switch a first wait time after the first AC voltage decreases under the third threshold voltage and turn off the third switch when the second AC voltage decreases under the third threshold voltage, and generate the fourth on and off control signals so as to turn on the fourth switch a second wait time after the second AC voltage decreases under the third threshold voltage and turn off the fourth switch when the first AC voltage decreases under the third threshold voltage (an eighteenth configuration).

In the switching rectifier circuit of the sixteenth or seventeenth configuration described above, preferably, the timing generator is adapted to generate the first on and off control signals so as to turn on the first switch when the first AC voltage increases over the first threshold voltage and turn off the first switch when the first AC voltage decreases under the second threshold voltage or a predetermined time after the first AC voltage has increased over the first threshold voltage, generate the second on and off control signals so as to turn on the second switch when the second AC voltage increases over the first threshold voltage and turn off the second switch when the second AC voltage decreases under the second threshold voltage or a predetermined time after the second AC voltage has increased over the first threshold voltage, generate the third on and off control signals so as to turn on the third switch a first wait time after the first AC voltage decreases under the third threshold voltage and turn off the third switch when the second AC voltage decreases under the third threshold voltage, and generate the fourth on and off control signals so as to turn on the fourth switch a second wait time after the second AC voltage decreases under the third threshold voltage and turn off the fourth switch when the first AC voltage decreases under the third threshold voltage (a nineteenth configuration).

In the switching rectifier circuit of the eighteenth or nineteenth configuration described above, preferably, the timing generator is adapted to ignore a drop in the first and second AC voltages under the second threshold voltage when turning on the first and second switches respectively (a twentieth configuration).

In the switching rectifier circuit of any one of the first to twentieth configuration described above, preferably, the first to fourth switches are all field-effect transistors (a twenty-first configuration).

In the switching rectifier circuit of the twenty-first configuration described above, preferably, the timing controller is adapted to keep the first to fourth switches all off until the DC voltage reaches a predetermined level and rectify the AC voltages into the DC voltage through rectification operation using body diodes of the first to fourth switches respectively (a twenty-second configuration).

According to yet another aspect of the invention, a battery charger includes the switching rectifier circuit according to any one of the first to twenty-second configurations described above, and the controls the charging of a battery cell by using the DC voltage (a twenty-third configuration).

In the battery charger according to the twenty-third configuration described above, there may be further provided a transformer coupling between a commercial AC power source and the switching rectifier circuit on a non-contact basis (a twenty-fourth configuration).

Advantageous Effects of the Invention

According to the present invention, it is possible to provide a switching rectifier circuit that contributes to higher power conversion efficiency, and to provide a battery charger employing such a switching rectifier circuit

DESCRIPTION OF EMBODIMENTS

Hereinafter, the present invention will be described in detail by way of exemplary configurations where it is applied to a switching rectifier circuit incorporated in a battery charger.

<Battery Charger>

Figure 1:
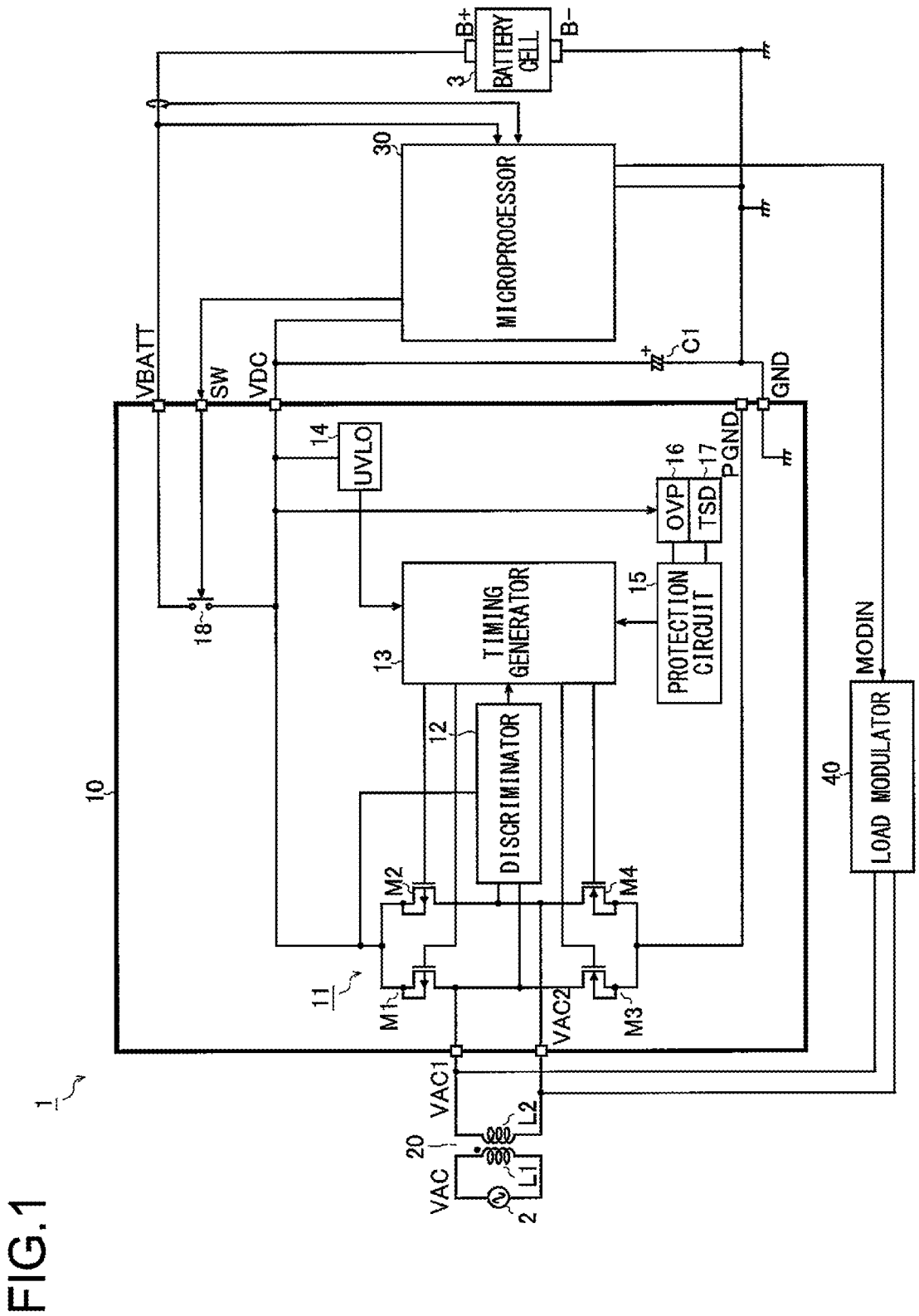
FIG. 1 is a block diagram showing one exemplary configuration of a battery charger according to the invention.

FIG. 1 is a block diagram showing an exemplary configuration of a battery charger according to the invention. The battery charger 1 of this exemplary configuration includes a switching rectifier IC 10, a transformer 20, a microprocessor 30, and a load modulator 40, and controls the charging of a battery cell 3 by use of a DC (direct-current) voltage VDC obtained by rectifying on a full-wave basis an AC (alternating-current) voltage VAC from a commercial AC power source 2.

The switching rectifier IC 10 has integrated into it an H bridge 11, a discriminator 12, a timing generator 13, an undervoltage detector 14 (UVLO, undervoltage lock-out), a protection circuit 15, an overvoltage detector 16 (OVP, overvoltage protection), an abnormal temperature detector 17 (TSD, thermal shut-down), and a switch 18. Connected to the switching rectifier IC 10 externally to it are the transformer 20, the microprocessor 30, the load modulator 40, the battery cell 3, and discrete components such as an output capacitor C1. The configuration of the switching rectifier IC 10 will be described in detail later.

The transformer 20 serves as a means of connecting between the commercial AC power source 2 and the switching rectifier IC 1 on a non-contact basis, and has a primary coil L1 and a secondary coil L2.

The microprocessor 30 receives a DC voltage VDC from the switching rectifier IC 10, and operates to monitor the battery voltage VBATT, generate a switch signal SW, generate a modulation input signal MODIN, and otherwise.

The load modulator 40 transfers the modulation input signal MODIN fed from the microprocessor 30 to the primary side via the transformer 20.

<Switching Rectification IC>

The H bridge 11 is composed of P-channel MOS field-effect transistors M1 and M2 and N-channel MOS field-effect transistors M3 and M4 connected in an H bridge configuration.

The source and backgate of the transistor M1 are both connected to a terminal to which the DC voltage VDC is applied. The drain of the transistor M1 is connected to a terminal to which a first AC voltage VAC1 (the AC voltage appearing at a first end of the secondary coil L2) is applied. The gate of the transistor M1 is connected to the timing generator 13 (specifically, to a terminal to which a first gate signal G1 is output). Thus, the transistor M1 corresponds to a first switch connected between the terminals to which the first AC voltage VAC1 and the DC voltage VDC, respectively, are applied.

The source and backgate of the transistor M2 are both connected to the terminal to which the DC voltage VDC is applied. The drain of the transistor M2 is connected to a terminal to which a second AC voltage VAC2 (the AC voltage appearing at a second end of the secondary coil L2) is applied. The gate of the transistor M2 is connected to the timing generator 13 (specifically, to a terminal to which a second gate signal G2 is output). Thus, the transistor M2 corresponds to a second switch connected between the terminals to which the second AC voltage VAC2 and the DC voltage VDC, respectively, are applied.

The source and backgate of the transistor M3 are both connected to a terminal to which a reference voltage VSS (in FIG. 1, a ground voltage PGND) is applied. The drain of the transistor M3 is connected to the terminal to which the first AC voltage VAC1 is applied. The gate of the transistor M3 is connected to the timing generator 13 (specifically, to a terminal to which a third gate signal G3 is output). Thus, the transistor M3 corresponds to a third switch connected between the terminals to which the first AC voltage VAC1 and the reference voltage VSS, respectively, are applied.

The source and backgate of the transistor M4 are both connected to the terminal to which the reference voltage VSS is applied. The drain of the transistor M4 is connected to the terminal to which the second AC voltage VAC2 is applied. The gate of the transistor M4 is connected to the timing generator 13 (specifically, to a terminal to which a fourth gate signal G4 is output). Thus, the transistor M4 corresponds to a fourth switch connected between the terminals to which the second AC voltage VAC2 and the reference voltage VSS, respectively, are applied.

It is preferable to use as the transistors M1 to M4 power-path MOS FETs with a low on-state resistance.

The discriminator 12 compares each of the first and second AC voltages VAC1 and VAC2 with each of the DC voltage VDC and the reference voltage VSS, generates detection signals reflecting the results of the comparisons, and feeds them to the timing generator 13. The specific circuit configuration and operation of the discriminator 12 will be described in detail later.

The timing generator 13 turns on and off the transistors M1 to M4 based on the detection signals fed from the discriminator 12. The timing generator 13 also has the function of stopping the rectification operation by turning the transistors M1 to M4 all off, or by turning the transistors M3 and M4 both on and thereby short-circuiting both ends of the primary coil L1, based on an undervoltage protection signal fed from the undervoltage detector 14 and a fault protection signal fed from the protection circuit 15. The specific operation of the timing generator 13 will be described in detail later.

The undervoltage detector 14 generates an undervoltage protection signal which indicates whether or not the DC voltage VDC is equal to or higher than a predetermined level, and feeds it to the timing generator 13. Based on the undervoltage protection signal, the timing generator 13 keeps the transistors M1 to M4 all off until the DC voltage VDC reaches the predetermined level. Specifically, until the DC voltage VDC reaches the predetermined level, the switching rectifier IC 10 rectifies the AC voltage VAC into the DC voltage VDC through rectification operation using the body diodes D1 to D4 (see FIGS. 2A, 2B, 3, etc.) parasitic to the transistors M1 to M4 respectively.

Based on an overvoltage detection signal fed from the overvoltage detector 16 and an abnormal temperature detection signal fed from the abnormal temperature detector 17, the protection circuit 15 generates a fault protection signal which indicates whether or not there is some fault in the switching rectifier IC 10, and feeds it to the timing generator 13. When the timing generator 13 recognizes that there is some fault in the switching rectifier IC 10 based on the fault protection signal, it forcibly stops the transistors M1 to M4.

The overvoltage detector 16 generates an overvoltage detection signal which indicates whether or not the DC voltage VDC is equal to or higher than a predetermined level, and feeds it to the protection circuit 15.

The abnormal temperature detector 17 generates an abnormal temperature detection signal which indicates whether or not the internal temperature of the switching rectifier IC 10 equal to or higher than a predetermined level, and feeds it to the protection circuit 15.

A first terminal of the switch 18 is connected to a terminal to which the battery voltage VBATT is applied. A second terminal of the switch 18 is connected to the terminal to which the DC voltage VDC is applied. The control terminal of the switch 18 is connected to a terminal to which the switch signal SW is fed.

A switching rectifier circuit that rectifies the AC voltage VAC on a full-wave basis to produce the DC voltage VDC is constituted by, of the components mentioned above, the H bridge 11, the discriminator 12, the timing generator 13, and the output capacitor C1 in particular.

<Switching Rectification Operation>

Figure 2A:
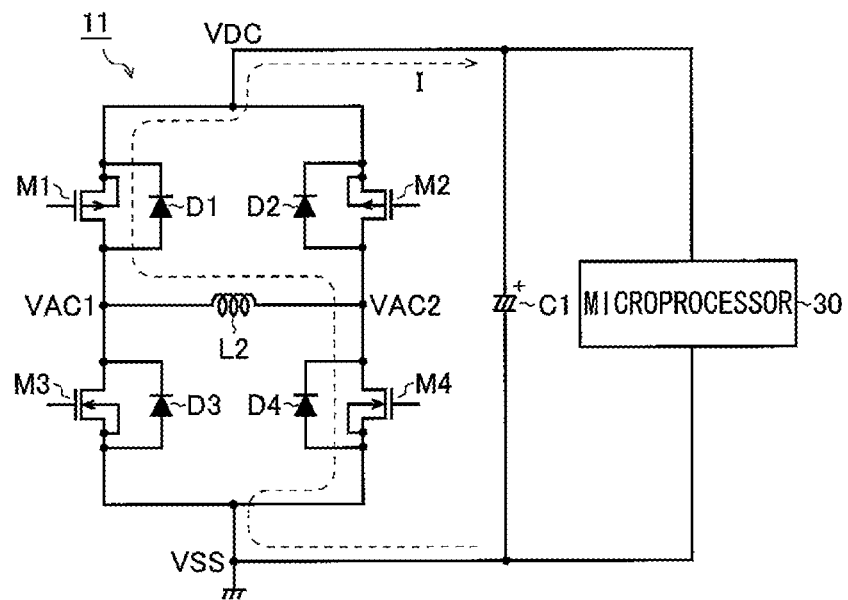
FIG. 2A is a circuit diagram illustrating switching rectification operation (in a first operation state)
Figure 2B:
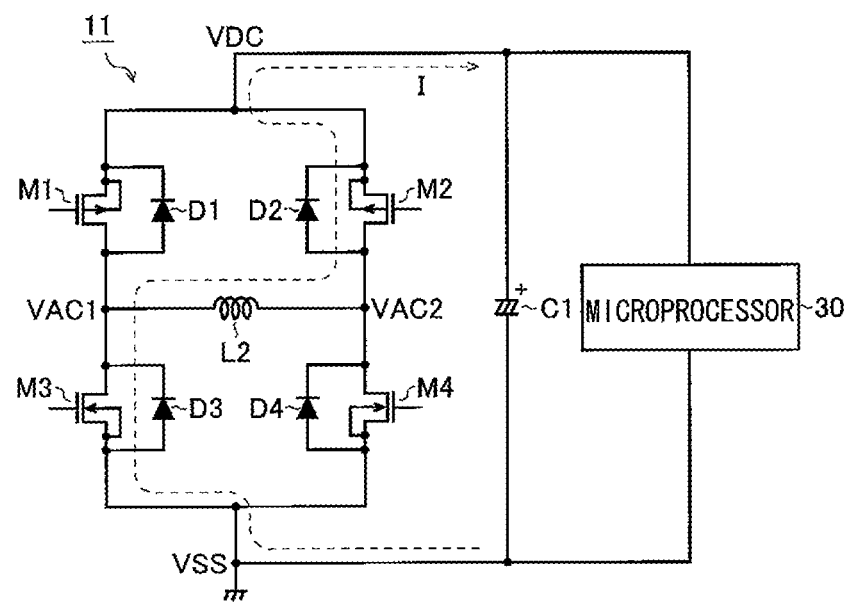
FIG. 2B is a circuit diagram illustrating switching rectification operation (in a second operation state)

FIGS. 2A and 2B are circuit diagrams illustrating switching rectification operation. In a state where the transistors M1 and M4 are on and the transistors M2 and M3 are off, current I passes through the path shown in FIG. 2A, and the output capacitor C1 is charged. On the other hand, in a state where the transistors M1 and M4 are off and the transistors M2 and M3 are on, current I passes through the path shown in FIG. 2B, and the output capacitor C1 is charged. Through this switching control, the AC voltage VAC is rectified on a full-wave basis into the DC voltage VDC. In a state where the transistors M1 to M4 are all off, the AC voltage VAC is rectified into the DC voltage VDC through rectification operation using the body diodes D1 to D4.

<Embodiment 1>

Figure 3:
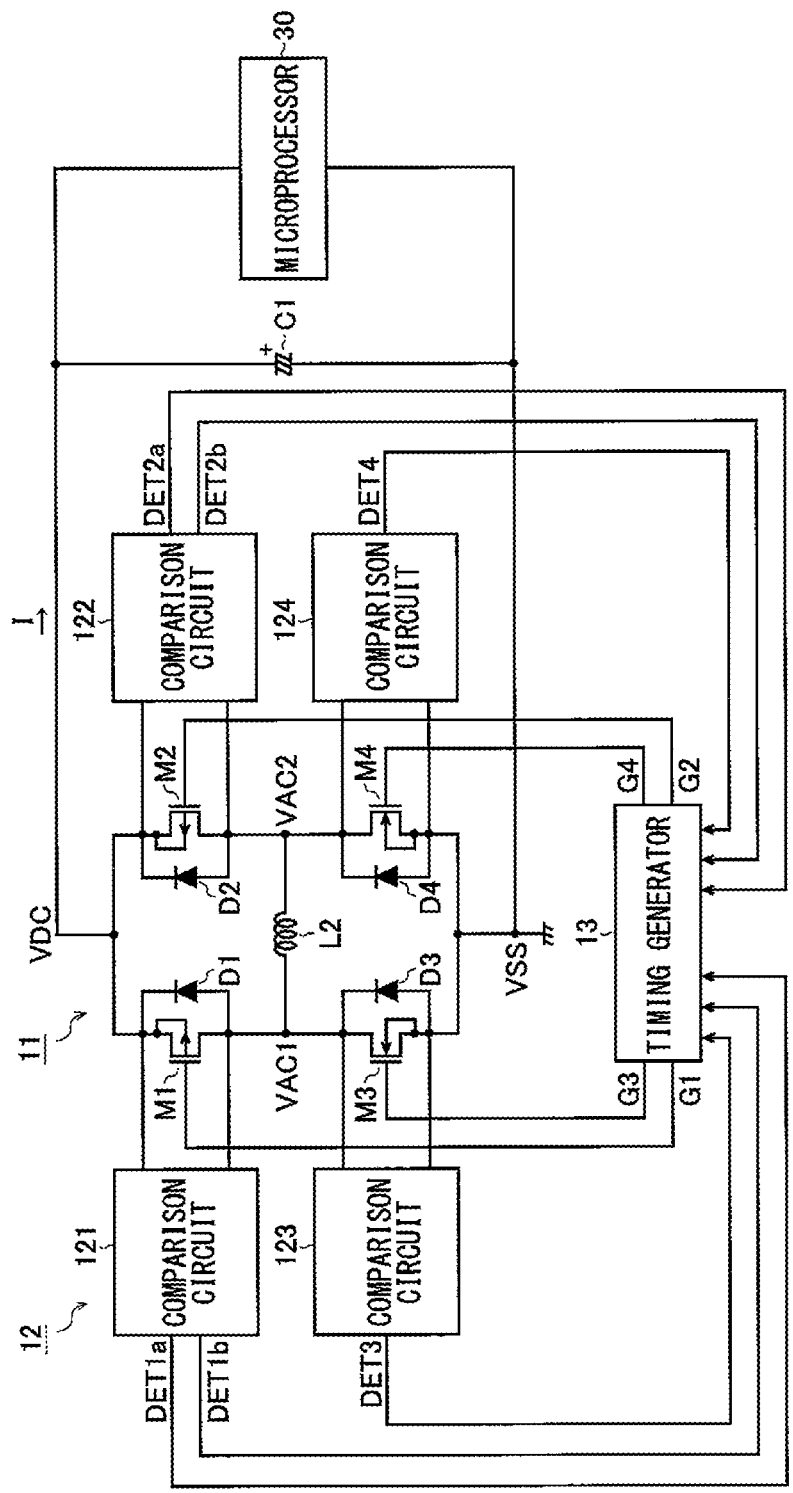
FIG. 3 is a circuit diagram showing a switching rectifier circuit according to a first embodiment of the invention.

FIG. 3 is a circuit diagram of a switching rectifier circuit according to a first embodiment of the invention. The switching rectifier circuit according to the first embodiment has, as the discriminator 12, comparison circuits 121 to 124. The comparison circuit 121 receives the first AC voltage VAC and the DC voltage VDC, and generates a first on detection signal DET1*a* and a first off detection signal DET1*b* individually. The comparison circuit 122 receives the second AC voltage VAC and the DC voltage VDC, and generates a second on detection signal DET2*a* and a second off detection signal DET2*b* individually. The comparison circuit 123 receives the first AC voltage VAC and the reference voltage VSS, and generates a third detection signal DET3. The comparison circuit 124 receives the second AC voltage VAC2 and the reference voltage VSS, and generates a fourth detection signal DET4.

Figure 4:
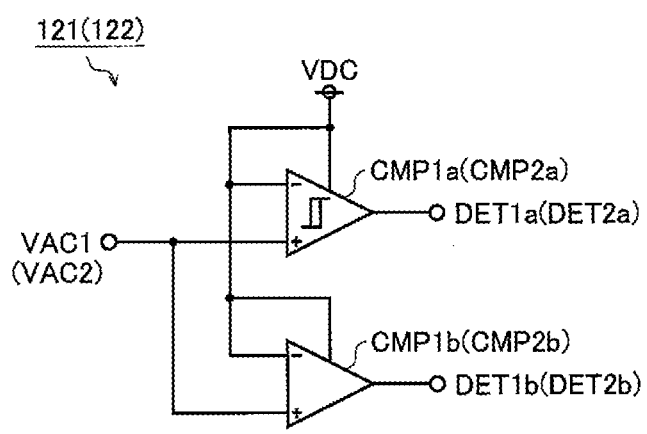
FIG. 4 is a circuit diagram showing one exemplary configuration of comparators 121 and 122.

FIG. 4 is a circuit diagram showing one exemplary configuration of the comparison circuits 121 and 122. With this exemplary configuration, the comparison circuit 121 includes a hysteresis comparator CMP1*a* and a comparator CMP1*b*, and the comparison circuit 122 includes a hysteresis comparator CMP2*a* and a comparator CMP2*b*.

The non-inverting input terminal (+) of the hysteresis comparator CMP1*a* is connected to the terminal to which the first AC voltage VAC1 is applied. The inverting input terminal (−)

of the hysteresis comparator CMP1a is connected to the terminal to which the DC voltage VDC is applied. The hysteresis comparator CMP1a is configured to compare the first AC voltage VAC1 with a first threshold voltage (VDC+X1), which is higher than the DC voltage VDC by a first offset voltage X1, and with a third threshold voltage (VDC−X3), which is lower than the DC voltage VDC by a third offset voltage X3, in order to switch the logic level of the first on detection signal DET1a. Specifically, when the first AC voltage VAC1 increases over the first threshold voltage (VDC+X1), the hysteresis comparator CMP1a turns the first on detection signal DET1a to high level; when the first AC voltage VAC1 decreases under the third threshold voltage (VDC−X3), the hysteresis comparator CMP1a turns the first on detection signal DET1a to low level.

The non-inverting input terminal (+) of the comparator CMP1b is connected to the terminal to which the first AC voltage VAC1 is applied. The inverting input terminal (−) of the comparator CMP1b is connected to the terminal to which the DC voltage VDC is applied. The comparator CMP1b is configured to compare the first AC voltage VAC1 with a second threshold voltage (VDC+X2), which is higher than the DC voltage VDC but lower than the first threshold voltage (VDC+X1), to switch the logic level of the first off detection signal DET1b. Specifically, when the first AC voltage VAC1 increases over the second threshold voltage (VDC+X2), the comparator CMP1b turns the first off detection signal DET1b to high level; when the first AC voltage VAC1 decreases under the second threshold voltage (VDC+X2), the comparator CMP1b turns the first off detection signal DET1b to low level.

The non-inverting input terminal (+) of the hysteresis comparator CMP2a is connected to the terminal to which the second AC voltage VAC2 is applied. The inverting input terminal (−) of the hysteresis comparator CMP2a is connected to the terminal to which the DC voltage VDC is applied. The hysteresis comparator CMP2a is configured to compare the second AC voltage VAC2 with the first threshold voltage (VDC+X1) and with the third threshold voltage, both mentioned above, in order to switch the logic level of the second on detection signal DET2a. Specifically, when the second AC voltage VAC2 increases over the first threshold voltage (VDC+X1), the hysteresis comparator CMP2a turns the second on detection signal DET2a to high level; when the second AC voltage VAC2 decreases under the third threshold voltage (VDC−X3), the hysteresis comparator CMP2a turns the second on detection signal DET2a to low level.

The non-inverting input terminal (+) of the comparator CMP2b is connected to the terminal to which the second AC voltage VAC2 is applied. The inverting input terminal (−) of the comparator CMP2b is connected to the terminal to which the DC voltage VDC is applied. The comparator CMP2b is configured to compare the second AC voltage VAC2 with the second threshold voltage (VDC+X2), mentioned above, to switch the logic level of the second off detection signal DET2b. Specifically, when the second AC voltage VAC2 increases over the second threshold voltage (VDC+X2), the comparator CMP2b turns the second off detection signal DET2b to high level; when the second AC voltage VAC2 decreases under the second threshold voltage (VDC+X2), the comparator CMP2b turns the second off detection signal DET2b to low level.

Preferably, the first offset voltage X1 is set within the range from 0.1 V to 0.4 V (lower than the on threshold voltage of the body diodes D1 and D2). Preferably, the second offset voltage X2 is set within the range from 0 to X1 (more specifically, at a voltage level commensurate with the on-state resistance of the transistors M1 and M2 multiplied by the output current I, for example in the range from 10 mV to 20 mV). Preferably, the third offset voltage X3 is set within the range from VSS (0 V) to VDC.

The logic levels of the first on detection signal DET1a, the first off detection signal DET1b, the second on detection signal DET2a, and the second off detection signal are in no way limited to, but may instead be just the opposite to, those specifically described above in terms of high and low levels.

As described above, the comparison circuit 121 is configured to have separately the hysteresis comparator CMP1a for generating the first on detection signal DET1a and the comparator CMP1b for generating the first off detection signal DET1b, and the comparison circuit 122 is configured to have separately the hysteresis comparator CMP2a for generating the second on detection signal DET2a and the comparator CMP2b for generating the second off detection signal DET2b.

Owing to the adoption of the configuration described above, it is possible to accurately set both the first threshold voltage (VDC+X1) and the second threshold voltage (VDC+X2), and thus it is possible to increase the accuracy with which the transistors M1 and M2 are turned on and off by the timing generator 13. Accordingly, with a switching rectifier circuit according to this embodiment, it is possible, with minimal operation of the body diodes D1 to D4 parasitic to the transistors M1 to M4, to reliably prevent a reverse flow of the output current I, and this helps increase the power conversion efficiency of the switching rectifier circuit.

Figure 5:
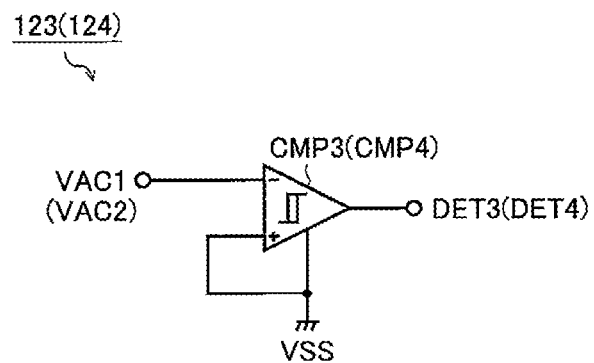
FIG. 5 is a circuit diagram showing one exemplary configuration of comparators 123 and 124.

FIG. 5 is a circuit diagram showing one exemplary configuration of the comparison circuits 123 and 124. With this exemplary configuration, the comparison circuit 123 includes a hysteresis comparator CMP3, and the comparison circuit 124 includes a hysteresis comparator CMP4.

The non-inverting input terminal (+) of the hysteresis comparator CMP3 is connected to the terminal to which the reference voltage VSS is applied. The inverting input terminal (−) of the hysteresis comparator CMP3 is connected to the terminal to which the first AC voltage VAC1 is applied. The hysteresis comparator CMP3 is configured to compare the first AC voltage VAC1 with a fourth threshold voltage (VSS−X4), which is lower than the reference voltage VSS by a fourth offset voltage X4, and with a fifth threshold voltage (VSS+X5), which is higher than the reference voltage VSS by a fifth offset voltage X5, in order to switch the logic level of the third detection signal DET3. Specifically, when the first AC voltage VAC1 decreases under the fourth threshold voltage (VSS−X4), the hysteresis comparator CMP3 turns the third detection signal DET3 to high level; when the first AC voltage VAC1 increases over the fifth threshold voltage, the hysteresis comparator CMP3 turns the third detection signal DET3 to low level.

The non-inverting input terminal (+) of the hysteresis comparator CMP4 is connected to the terminal to which the reference voltage VSS is applied. The inverting input terminal (−) of the hysteresis comparator CMP4 is connected to the terminal to which the second AC voltage VAC2 is applied. The hysteresis comparator CMP4 is configured to compare the second AC voltage VAC2 with the fourth threshold voltage (VSS−X4) and with the fifth threshold voltage (VSS+X5), both mentioned above, in order to switch the logic level of the fourth detection signal DET4. Specifically, when the second AC voltage VAC2 decreases under the fourth threshold voltage (VSS−X4), the hysteresis comparator CMP4 turns the fourth detection signal DET4 to high level; when the second AC voltage VAC2 increases over the fifth threshold voltage, the hysteresis comparator CMP4 turns the fourth detection signal DET4 to low level.

Preferably, the fourth offset voltage X4 is set within the range from 0.1 V to 0.4 V (lower than the on threshold voltage of the body diodes D3 and D4). Preferably, the fifth offset voltage X5 is set within the range from VSS (0 V) to VDC.

The logic levels of the third and fourth detection signals DET3 and DET4 are in no way limited to, but may instead be just the opposite to, those specifically described above in terms of high and low levels.

Based on the outputs from the comparison circuits 121 to 124 (the first on detection signal DET1a, the first off detection signal DET1b, the second on detection signal DET2a, the second off detection signal DET2b, the third detection signal DET3, and the fourth detection signal DET4), the timing generator 13 generates gate signals G1 to G4 to turn the transistors M1 to M4 on and off.

<A First Switching Rectification Operation>

Figure 6:
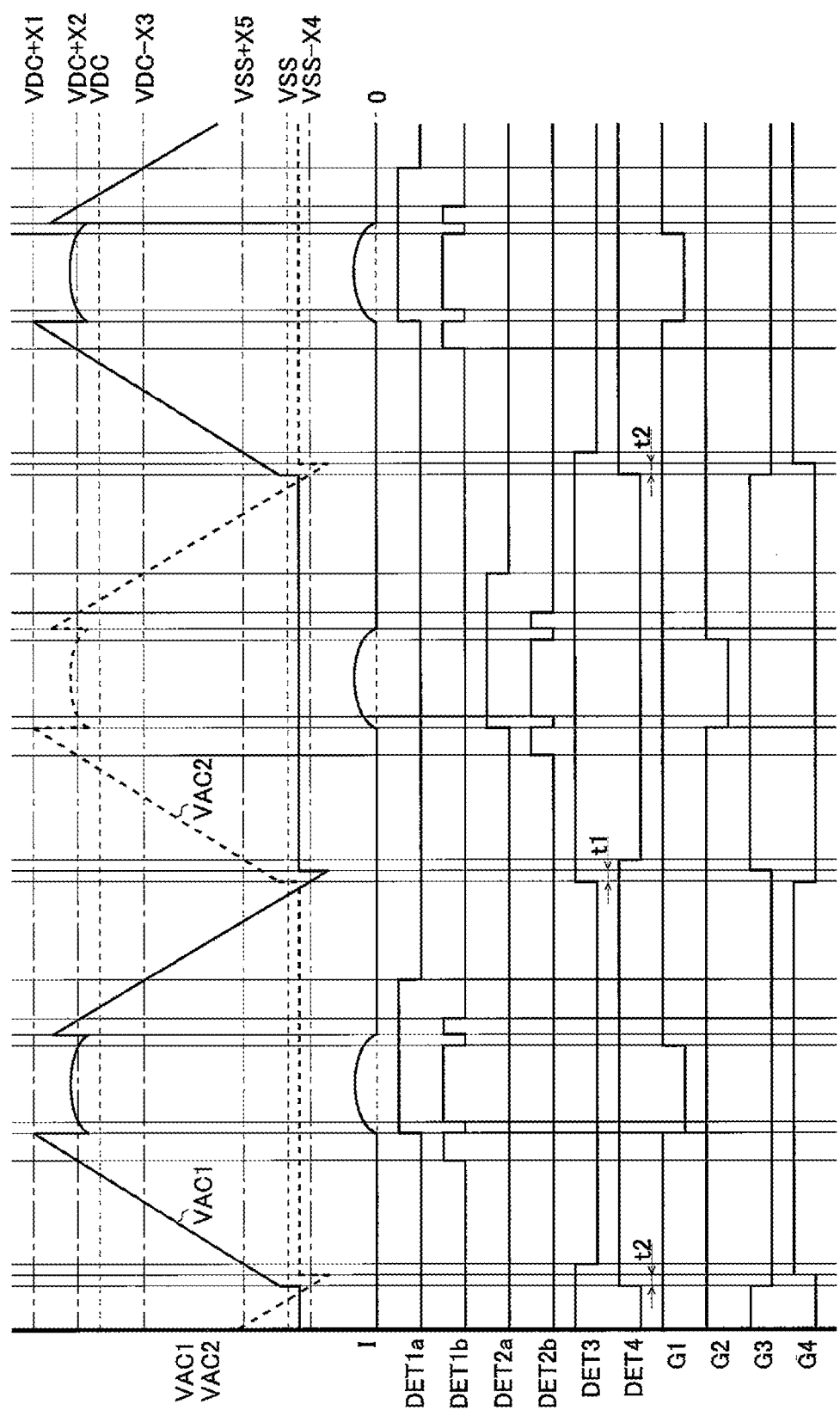
FIG. 6 is a timing chart showing a first switching rectification operation.

FIG. 6 is a timing chart showing a first switching rectification operation, and shows plots of, from top down, the first and second AC voltages VAC1 and VAC2, the output current I, the first on detection signal DET1a, the first off detection signal DET1b, the second on detection signal DET2a, the second off detection signal DET2b, the third detection signal DET3, the fourth detection signal DET4, and the gate signals G1 to G4.

With respect to the turning on and off of the transistor M1, the timing generator 13 operates as follows. When the first AC voltage VAC1 increases over the first threshold voltage (VDC+X1) and the first on detection voltage DET1a turns to high level, the timing generator 13 turns the gate signal G1 to low level and turns on the transistor M1. When the first AC voltage VAC1 decreases under the second threshold voltage (VDC+X2) and the first off detection signal DET1b turns to low level, the timing generator 13 turns the gate signal G1 to high level and turns off the transistor M1.

Likewise, with respect to the turning on and off of the transistor M2, the timing generator 13 operates as follows. When the second AC voltage VAC2 increases over the first threshold voltage (VDC+X1) and the second on detection voltage DET2a turns to high level, the timing generator 13 turns the gate signal G2 to low level and turns on the transistor M2. When the second AC voltage VAC2 decreases under the second threshold voltage (VDC+X2) and the second off detection signal DET2b turns to low level, the timing generator 13 turns the gate signal G2 to high level and turns off the transistor M2.

Inconveniently, when the first AC voltage VAC1 (or the second AC voltage VAC2) increases over the first threshold voltage (VDC+X1) and the transistor M1 (or M2) is turned on, the first AC voltage VAC1 (or the second AC voltage VAC2) drops to close to the DC voltage VDC and momentarily decreases under the second threshold voltage (VDC+X2). Thus, immediately after the transistor M1 (or M2) is turned on, the first off detection signal DET1b (or the second off detection signal DET2b) turns to low level unexpectedly.

To avoid that, the timing generator 13 is configured to ignore a momentary drop in the first and second AC voltage VAC1 and VAC2 under the second threshold voltage (VDC+X2) when turning on the transistors M1 and M2 respectively. For example, the timing generator 13 may be configured to ignore the first off detection signal DET1b (or the second off detection signal DET2b) for a predetermined masking period after the first on detection signal DET1a (or the second on detection signal DET2a) has turned to high level, or may be configured to detect the second low edge that occurs in the first off detection signal DET1b (or the second off detection signal DET2b) after the first on detection signal DET1a (or the second on detection signal DET2a) has turned to high level.

With this configuration, it is possible to prevent the transistor M1 (or M2) from being turned off unnecessarily by being triggered by an unexpected low edge in the first off detection signal DET1b (or the second off detection signal DET2b).

With respect to the turning on and off of the transistor M3, the timing generator 13 operates as follows. A first wait time t1 after the first AC voltage VAC1 has decreased under the fourth threshold voltage (VSS−X4) and the third detection signal DET3 has turned to high level, the timing generator 13 turns the gate signal G3 to high level and turns on the transistor M3. When the second AC voltage VAC2 decreases under the fourth threshold voltage (VSS−X4) and the fourth detection signal DET4 turns to high level, the timing generator 13 turns the gate signal G3 to low level and turns off the transistor M3.

Likewise, with respect to the turning on and off of the transistor M4, the timing generator 13 operates as follows. A second wait time t2 after the second AC voltage VAC2 has decreased under the fourth threshold voltage (VSS−X4) and the fourth detection signal DET4 has turned to high level, then, the timing generator 13 turns the gate signal G4 to high level and turns on the transistor M4. When the first AC voltage VAC1 decreases under the fourth threshold voltage (VSS−X4) and the third detection signal DET3 turns to high level, the timing generator 13 turns the gate signal G4 to low level and turns off the transistor M4.

With this configuration where the transistor M3 is turned on the first wait time t1 after the transistor M4 has been turned off and the transistor M4 is turned off the second wait time t2 after the transistor M3 has been turned off, it is possible to reliably prevent the transistors M3 and M4 from turning on simultaneously. The first and second wait time t1 and t2 may be equal or different.

With the switching rectification operation described above, it is possible, with minimal operation of the body diodes D1 to D4 parasitic to the transistors M1 to M4, to reliably prevent a reverse flow of the output current I, and this helps increase the power conversion efficiency of the switching rectifier circuit.

<Embodiment 2>

Figure 7:
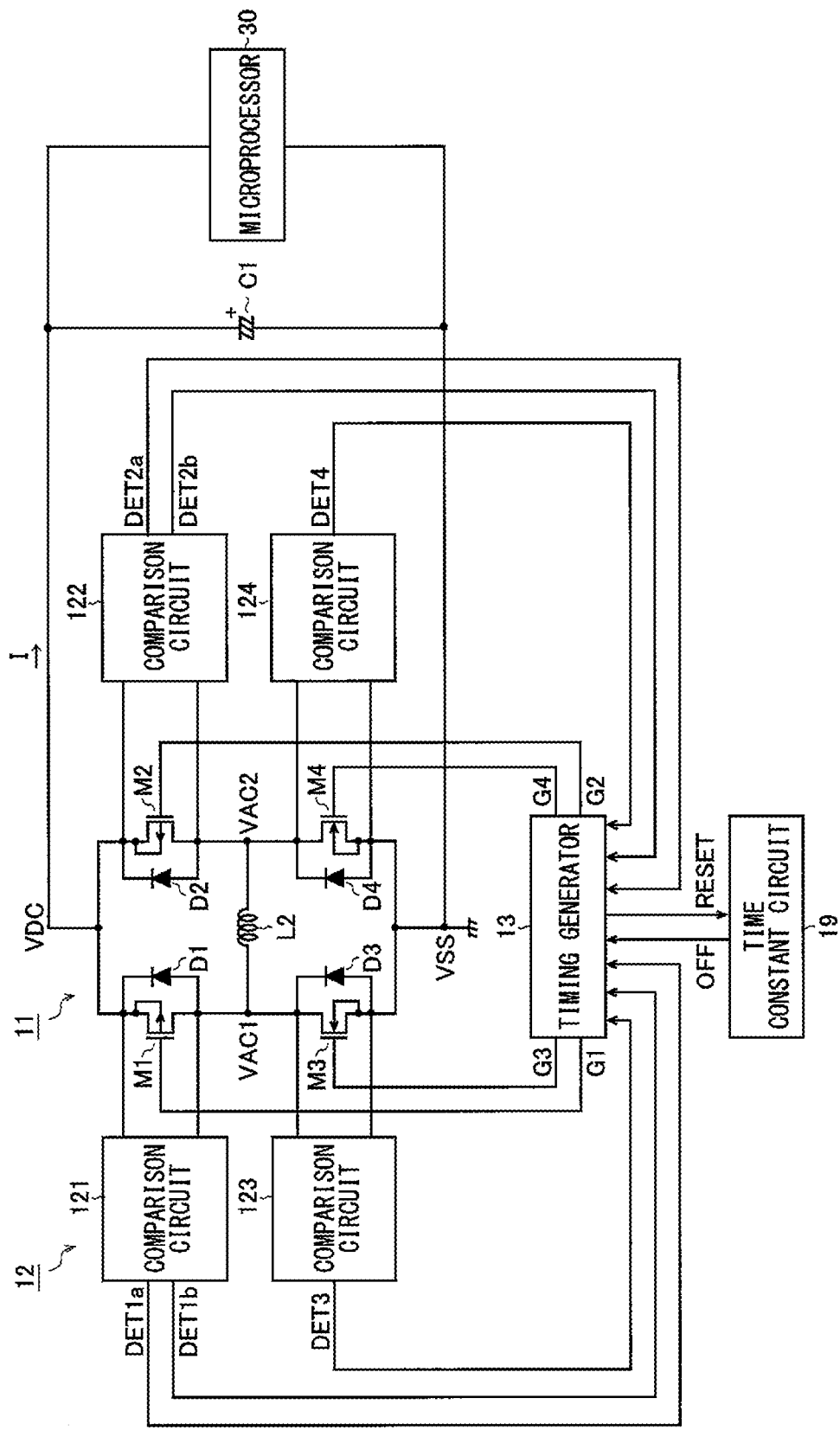
FIG. 7 is a circuit diagram showing a switching rectifier circuit according to a second embodiment of the invention.
Figure 8:
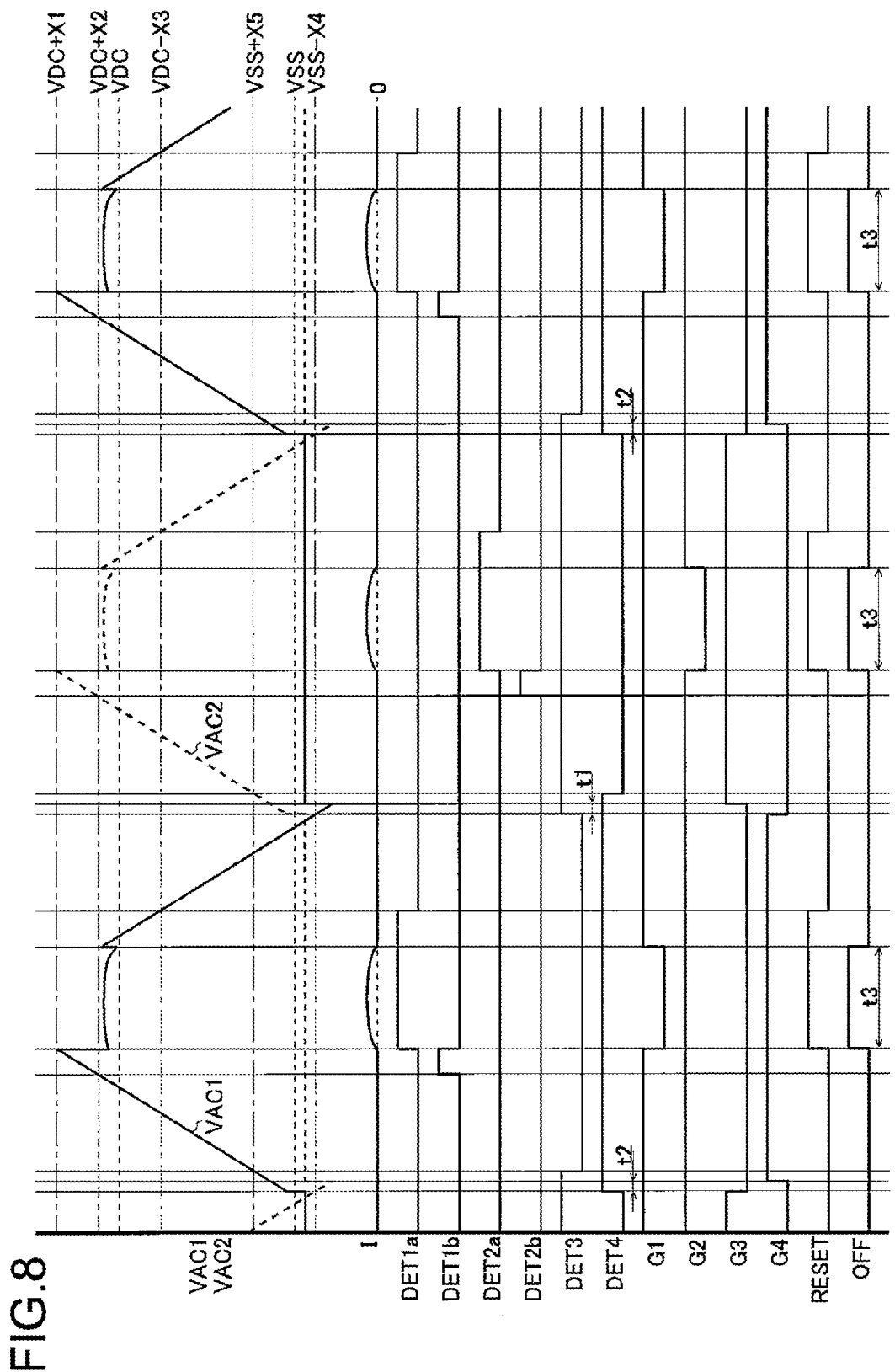
FIG. 8 is a timing chart showing a second switching rectification operation.

FIG. 7 is a circuit diagram showing a switching rectifier circuit according to a second embodiment of the invention, and FIG. 8 is a timing chart showing a second switching rectification operation. As shown in FIG. 7, the switching rectifier circuit according to the second embodiment has largely the same configuration as the one according to the first embodiment described previously, and is characterized by the addition of a time constant circuit 19. Accordingly, such circuit elements as find their counterparts in the first embodiment are identified by the same reference signs to omit overlapping description, and given below will be a detailed description of the significance of the addition of the time constant circuit 19 and its operation.

In a case where the output current I is sufficiently large (for example, when the output current I is set for a 500 mA mode), no problem occurs. In a case where the output current I is small (for example, when the output current I is set for a 100 mA mode), as shown in FIG. 8, after the transistor M1 (or M2) is turned on, the first AC voltage VAC1 (or the second AC voltage VAC2) may fail to reach the second threshold voltage (VDC+X2), making it impossible to detect the turning-off timing of the transistor M1 (or M2).

To avoid that, the switching rectifier circuit according to this embodiment is provided with the time constant circuit 19 as a means of forcibly turning the transistor M1 (or M2) off when a predetermined time t3 elapses after the first or second AC voltage VAC1 or VAC2 has increased over the first threshold voltage (VDC+X1), regardless of the first off detection signal DET1*b* (or the second off detection signal DET2*b*).

At the same time that a reset signal RESET (for example, the AND signal of the first and second on detection signals DET1*a* and DET2*a*) fed from the timing generator 13 is turned to high level, the time constant circuit 19 turns an off signal OFF to high level, and when the predetermined time t3 elapses thereafter, the time constant circuit 19 turns the off signal OFF to low level. The predetermined time t3 may be counted by an analog time counting method using a capacitor and a constant current source, or by a digital time counting method using a clock counter.

<A Second Switching Rectification Operation>

Based on the outputs (the first on detection signal DET1*a*, the first off detection signal DET1*b*, the second on detection signal DET2*a*, the second off detection signal DET2*b*, the third detection signal DET3, the fourth detection signal DET4, and the off signal OFF) of the comparison circuits 121 to 124 and of the time constant circuit 19, the timing generator 13 generates the gate signals G1 to G4 to turn the transistors M1 to M4 on and off.

Specifically, with respect to the turning on and off of the transistor M1, the timing generator 13 operates as follows. When the first AC voltage VAC1 increases over the first threshold voltage (VDC+X1) and the first on detection voltage DET1*a* turns to high level, the timing generator 13 turns the gate signal G1 to low level and turns on the transistor M1. When the first AC voltage VAC1 decreases under the second threshold voltage (VDC+X2) and the first off detection signal DET1*b* turns to low level, or when the off signal OFF turns to low level the predetermined time t3 after the first AC voltage VAC1 has increased over the first threshold voltage (VDC+X1), the timing generator 13 turns the gate signal G1 to high level and turns off the transistor M1.

Likewise, with respect to the turning on and off of the transistor M2, the timing generator 13 operates as follows. When the second AC voltage VAC2 increases over the first threshold voltage (VDC+X1) and the second on detection voltage DET2*a* turns to high level, the timing generator 13 turns the gate signal G2 to low level and turns on the transistor M2. When the second AC voltage VAC2 decreases under the second threshold voltage (VDC+X2) and the second off detection signal DET2*b* turns to low level, or when the off signal OFF turns to low level the predetermined time t3 after the second AC voltage VAC2 has increased over the first threshold voltage (VDC+X1), the timing generator 13 turns the gate signal G2 to high level and turns off the transistor M2.

The turning on and off of the transistors M3 and M4 is handled in a similar manner as in the first embodiment described previously (the first switching rectification operation (FIG. 6)), and therefore no overlapping description will be repeated.

With this configuration, even if, after the transistor M1 (or M2) is turned on, the first AC voltage VAC1 (or the second AC voltage VAC2) does not reach the second threshold voltage (VDC+X2), regardless of the first off detection signal DET1*b* (or the second off detection signal DET2*b*), it is possible, by using the off signal OFF, to forcibly turn off the transistor M1 (or M2). It is thus possible to prevent a reverse flow of the output current I.

It is preferable that the predetermined time t3 above be controlled to vary so as to be the shorter the higher the voltage level of the DC voltage VDC. This configuration is usable in applications where the DC voltage VDC varies (as in battery chargers).

<A Third Switching Rectification Operation>

Figure 9:
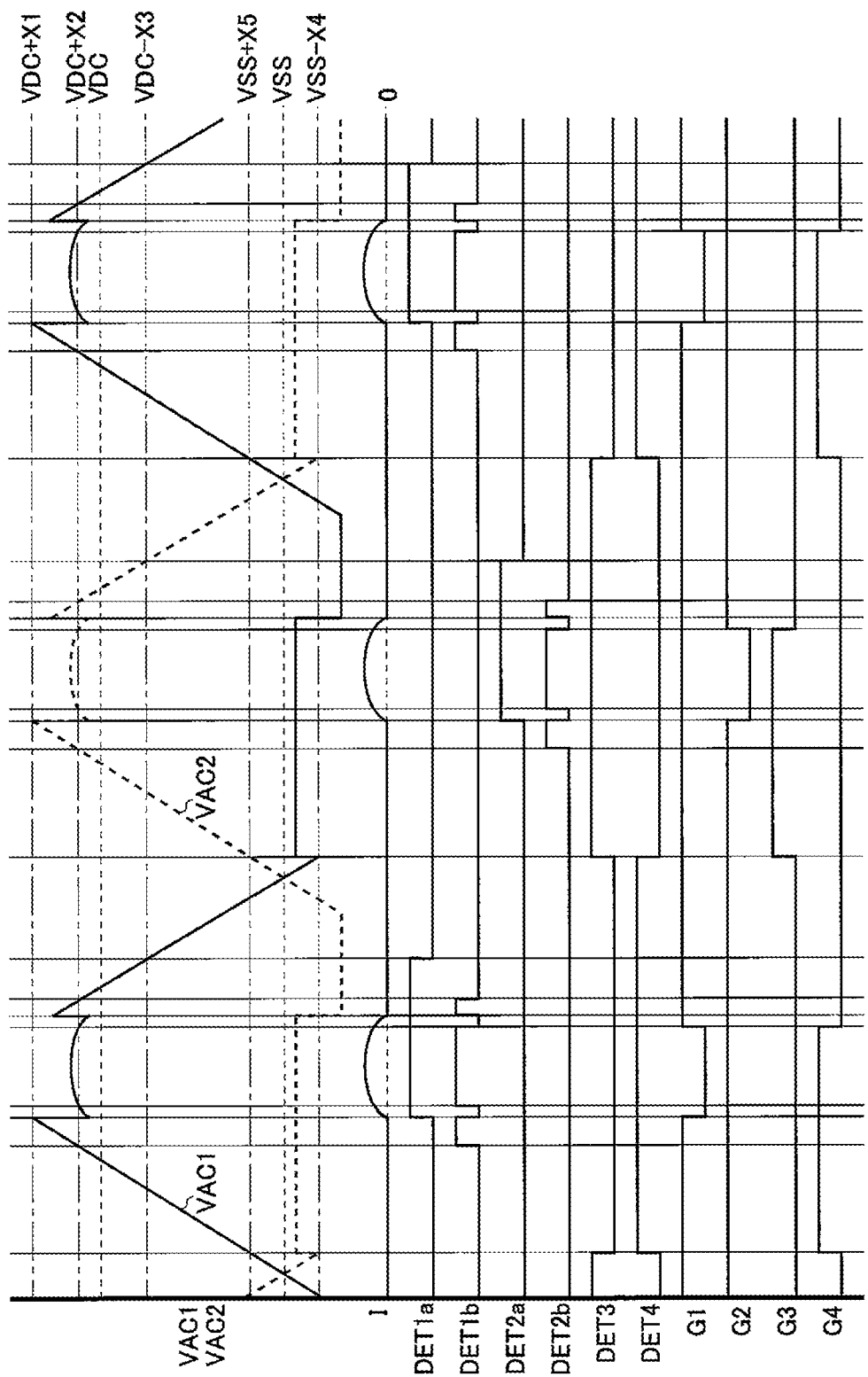
FIG. 9 is a timing chart showing a third switching rectification operation.

FIG. 9 is a timing chart showing a third switching rectification operation, which is characterized in particular by how the turning on and off of the transistors M3 and M4 is controlled (how the gate signals G3 and G4 are generated). The third switching rectification operation may be implemented in both of the configuration according to the first embodiment (see FIG. 3) and the configuration according to the second embodiment (see FIG. 7).

With respect to the turning on and off of the transistor M3, the timing generator 13 operates as follows. When the first AC voltage VAC1 decreases under the fourth threshold voltage (VSS−X4) and the third detection signal DET3 turns to high level, the timing generator 13 turns the gate signal G3 to high level and turns on the transistor M3. When the second AC voltage VAC2 decreases under the second threshold voltage (VDC+X2) and the second off detection signal DET2*b* turns to low level, the timing generator 13 turns the gate signal G3 to low level and turns off the transistor M3.

Likewise, with respect to the turning on and off of the transistor M4, the timing generator 13 operates as follows. When the second AC voltage VAC2 decreases under the fourth threshold voltage (VSS−X4) and the fourth detection signal DET4 turns to high level, the timing generator 13 turns the gate signal G4 to high level and turns on the transistor M4. When the first AC voltage VAC1 decreases under the second threshold voltage (VDC+X2) and the first off detection signal DET1*b* turns to low level, the timing generator 13 turns the gate signal G4 to low level and turns off the transistor M4.

The turning on and off of the transistors M1 and M2 is handled in a similar manner as in the first embodiment described previously, and therefore no overlapping description will be repeated.

Also with the third switching rectification operation described above, as with the first and second switching rectification operations described previously, it is possible, with minimal operation of the body diodes D1 to D4 parasitic to the transistors M1 to M4, to reliably prevent a reverse flow of the output current I, and this helps increase the power conversion efficiency of the switching rectifier circuit.

<A Fourth Switching Rectification Operation>

Figure 10:
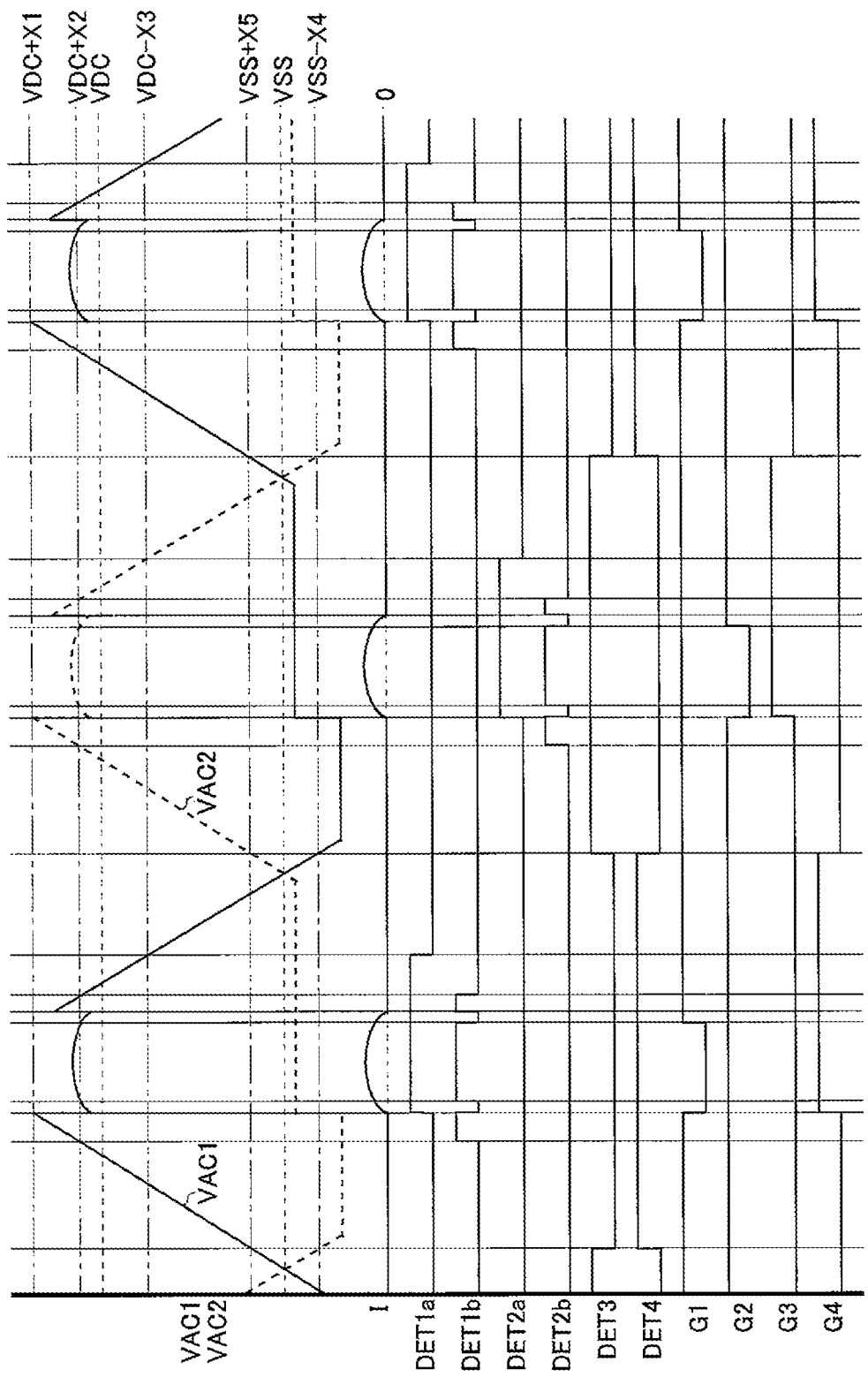
FIG. 10 is a timing chart showing a fourth switching rectification operation.

FIG. 10 is a timing chart showing a fourth switching rectification operation, which is characterized in particular by how the turning on and off of the transistors M3 and M4 is controlled (how the gate signals G3 and G4 are generated). The fourth switching rectification operation may be implemented in both of the configuration according to the first embodiment (see FIG. 3) and the configuration according to the second embodiment (see FIG. 7).

With respect to the turning on and off of the transistor M3, the timing generator 13 operates as follows. When the second AC voltage VAC2 increases over the first threshold voltage (VDC+X1) and the second on detection signal DET2*a* turns to high level, the timing generator 13 turns the gate signal G3 to high level and turns on the transistor M3. When the second AC voltage VAC2 decreases under the fourth threshold voltage (VSS−X4) and the fourth detection signal DET4 turns to high level, the timing generator 13 turns the gate signal G3 to low level and turns off the transistor M3.

Likewise, with respect to the turning on and off of the transistor M4, the timing generator 13 operates as follows. When the first AC voltage VAC1 increases over the first threshold voltage (VDC+X1) and the first on detection signal DET1*a* turns to high level, the timing generator 13 turns the gate signal G4 to high level and turns on the transistor M4. When the first AC voltage VAC1 decreases under the fourth threshold voltage (VSS−X4) and the third detection signal DET3 turns to high level, the timing generator 13 turns the gate signal G4 to low level and turns off the transistor M4.

The turning on and off of the transistors M1 and M2 is handled in a similar manner as in the first embodiment described previously, and therefore no overlapping description will be repeated.

Also with the fourth switching rectification operation described above, as with the first to third switching rectification operations described previously, it is possible, with minimal operation of the body diodes D1 to D4 parasitic to the transistors M1 to M4, to reliably prevent a reverse flow of the output current I, and this helps increase the power conversion efficiency of the switching rectifier circuit.

<A Fifth Switching Rectification Operation>

Figure 11:
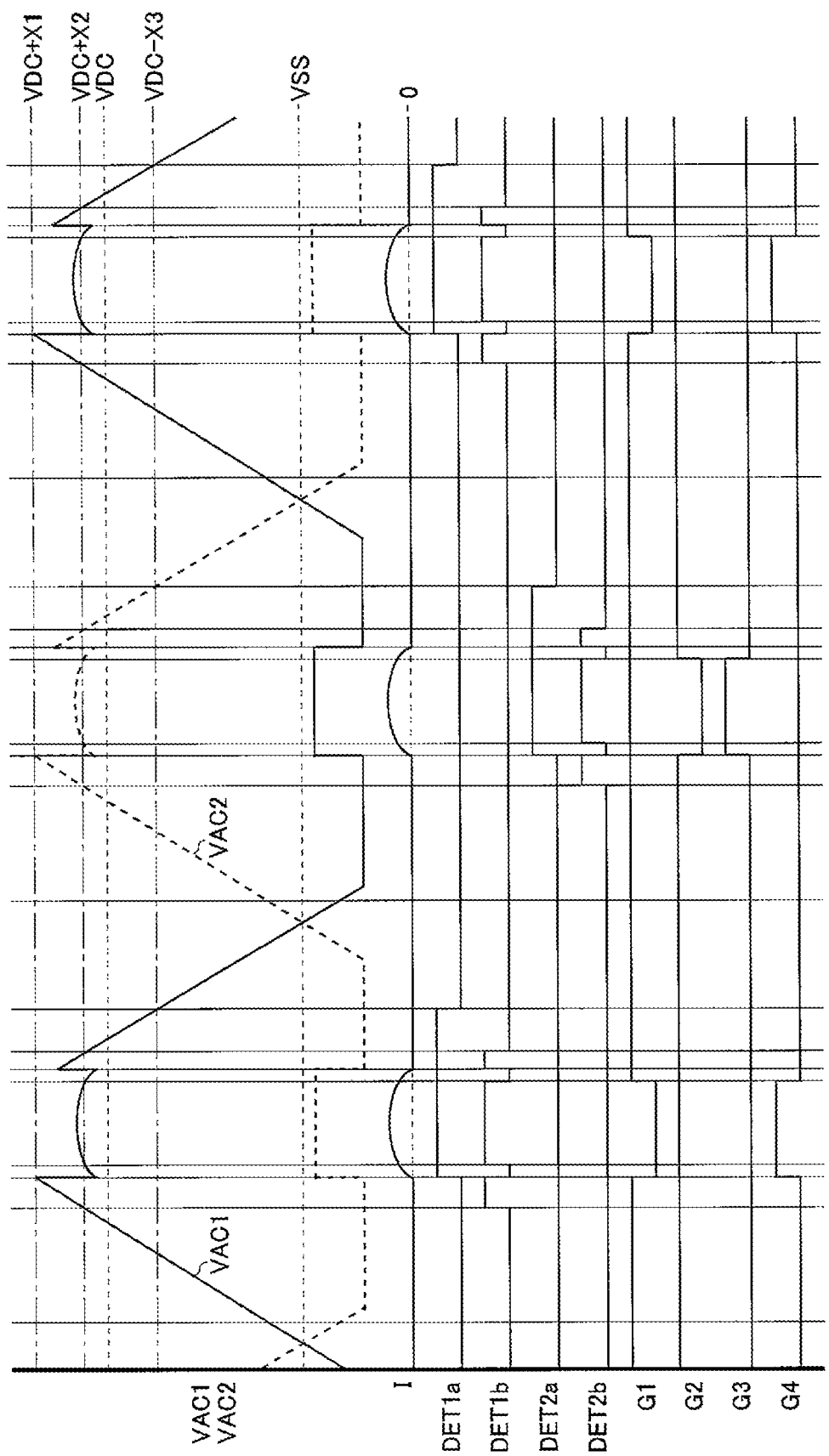
FIG. 11 is a timing chart showing a fifth switching rectification operation.

FIG. 11 is a timing chart showing a fifth switching rectification operation, which is characterized in particular by how the turning on and off of the transistors M3 and M4 is controlled (how the gate signals G3 and G4 are generated). The fifth switching rectification operation may be implemented in both of the configuration according to the first embodiment (see FIG. 3) and the configuration according to the second embodiment (see FIG. 7). However, the fifth switching rectification operation does not require the detection of the third and fourth detection signals DET3 and DET4, and therefore it is preferable that it be implemented in the third embodiment (see FIG. 12) described later, where the comparison circuits 123 and 124 are omitted.

With respect to the turning on and off of the transistor M3, the timing generator 13 operates as follows. When the second AC voltage VAC2 increases over the first threshold voltage (VDC+X1) and the second on detection signal DET2a turns to high level, the timing generator 13 turns the gate signal G3 to high level and turns on the transistor M3. When the second AC voltage VAC2 decreases under the second threshold voltage (VDC+X2) and the second off detection signal DET2b turns to low level, the timing generator 13 turns the gate signal G3 to low level and turns off the transistor M3. Thus, the gate signal G3 corresponds to the logical inversion of the gate signal G2.

Likewise, with respect to the turning on and off of the transistor M4, the timing generator 13 operates as follows. When the first AC voltage VAC1 increases over the first threshold voltage (VDC+X1) and the first on detection signal DET1a turns to high level, the timing generator 13 turns the gate signal G4 to high level and turns on the transistor M4. When the first AC voltage VAC1 decreases under the second threshold voltage (VDC+X2) and the first off detection signal DET1b turns to low level, the timing generator 13 turns the gate signal G4 to low level and turns off the transistor M4. Thus, the gate signal G4 corresponds to the logical inversion of the gate signal G1.

The turning on and off of the transistors M1 and M2 is handled in a similar manner as in the first embodiment described previously, and therefore no overlapping description will be repeated.

Also with the fifth switching rectification operation described above, as with the first to fourth switching rectification operations described previously, it is possible, with minimal operation of the body diodes D1 to D4 parasitic to the transistors M1 to M4, to reliably prevent a reverse flow of the output current I, and this helps increase the power conversion efficiency of the switching rectifier circuit.

<Embodiment 3>

Figure 12:
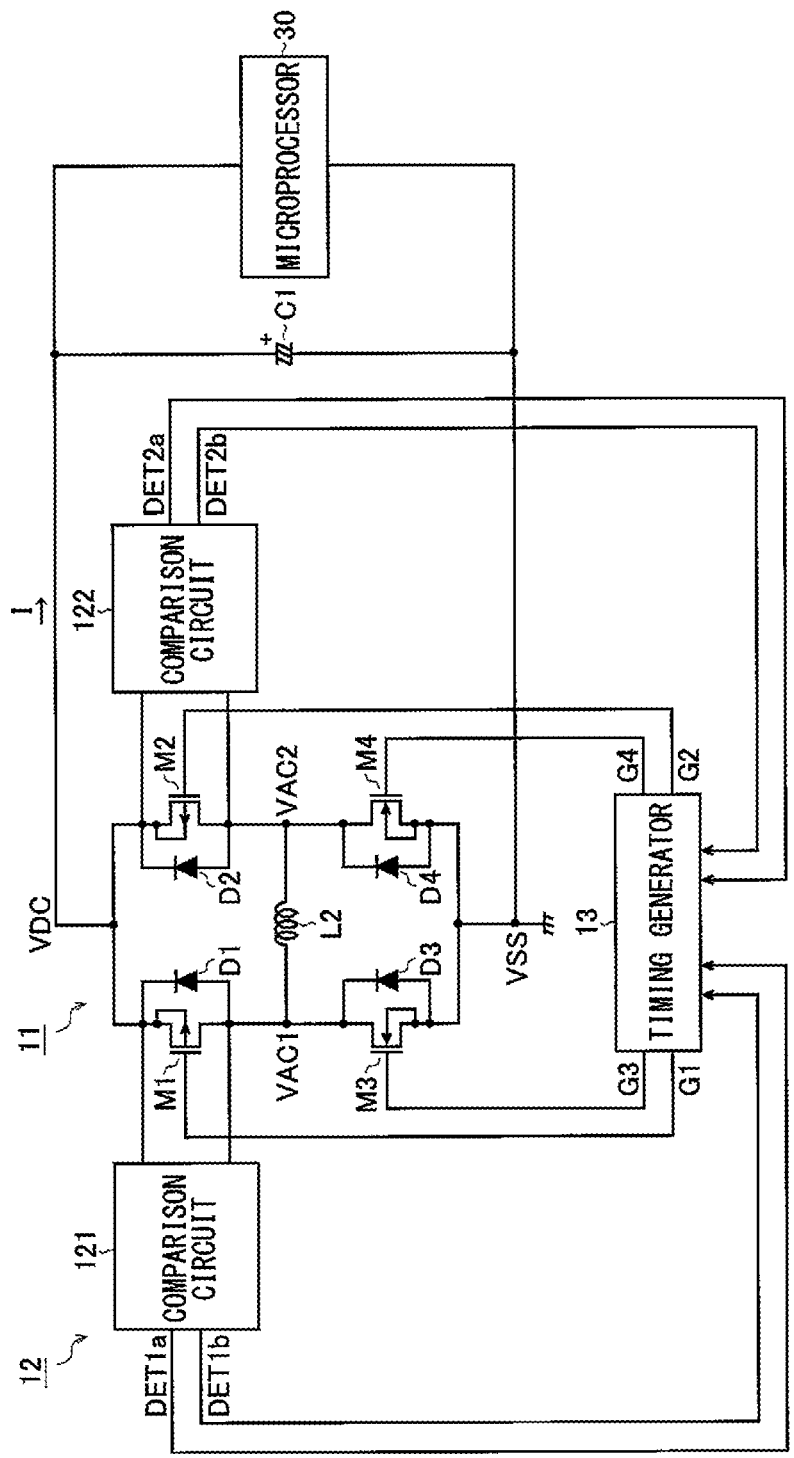
FIG. 12 is a circuit diagram showing a switching rectifier circuit according to a third embodiment of the invention.

FIG. 12 is a circuit diagram showing a switching rectifier circuit according to a third embodiment of the invention. Adapted for implementation of the fifth switching rectification operation described above, the switching rectifier circuit according to the third embodiment, compared with the configuration according to the first embodiment, lacks the comparison circuits 123 and 124. Adopting this configuration contributes to reduction in circuit scale.

<Embodiment 4>

Figure 13:
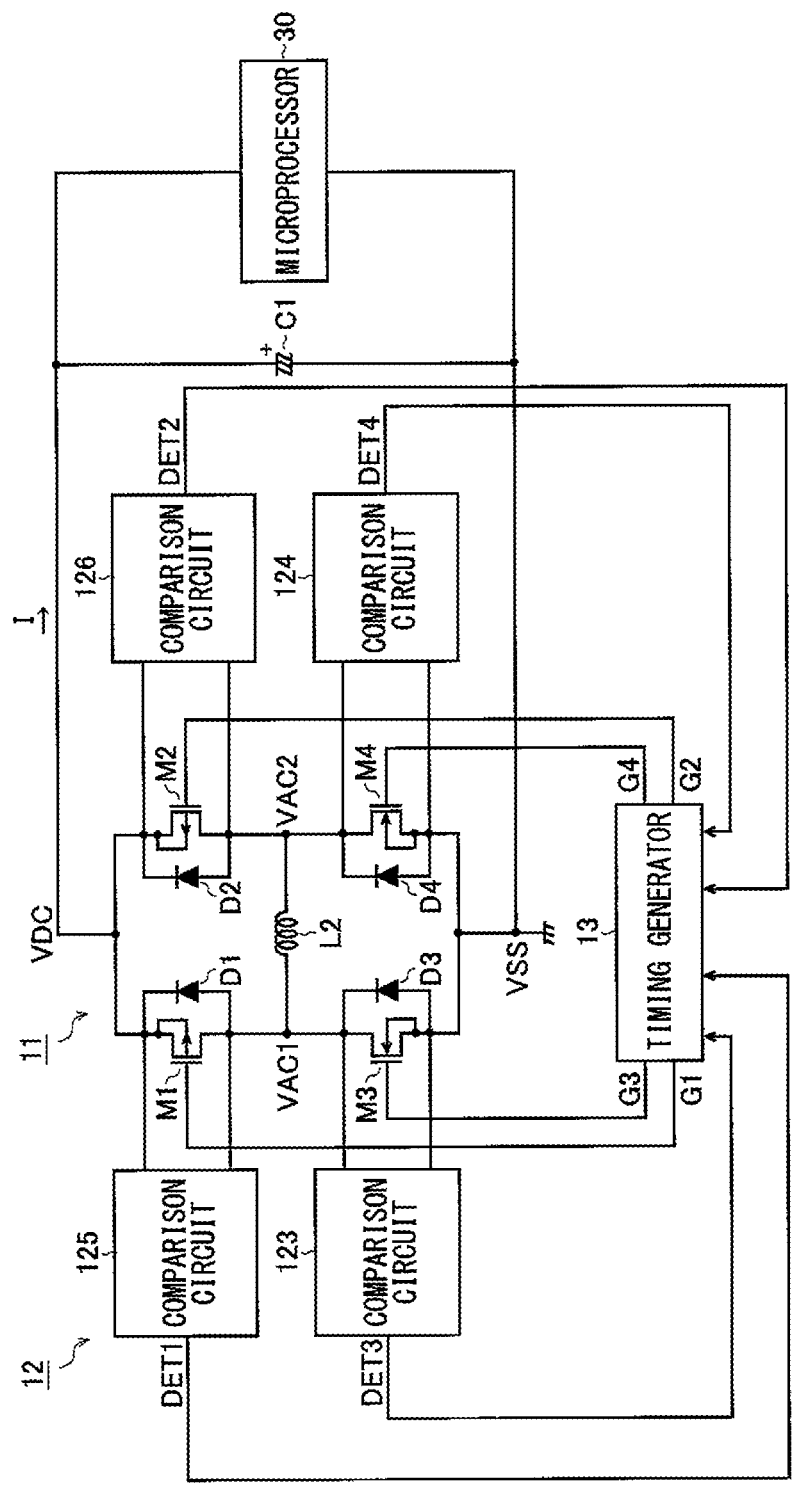
FIG. 13 is a circuit diagram showing a switching rectifier circuit according to a fourth embodiment of the invention.

FIG. 13 is a circuit diagram showing a switching rectification operation according to a fourth embodiment of the invention. The switching rectifier circuit of the fourth embodiment has largely the same configuration as the one according to the first embodiment described previously, and is characterized by the provision of comparison circuits 125 and 126 in place of the comparison circuits 121 and 122 described previously. Unlike the comparison circuit 121, which generates the first on detection signal DET1a and the first off detection signal DET1b individually, the comparison circuit 125 generates a first detection signal DET1 alone. Likewise, unlike the comparison circuit 122, which generates the second on detection signal DET2a and the second off detection signal DET2b individually, the comparison circuit 126 generates a second detection signal DET2 alone.

Figure 14:
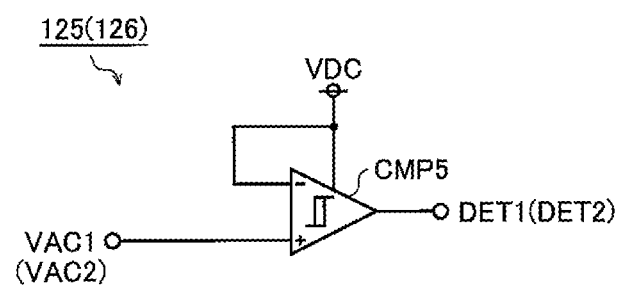
FIG. 14 is a circuit diagram showing one exemplary configuration of comparators 125 and 126.

FIG. 14 is a circuit diagram showing one exemplary configuration of the comparison circuits 125 and 126. With this exemplary configuration, the comparison circuit 125 includes a hysteresis comparator CMP5, and the comparison circuit 126 includes a hysteresis comparator CMP6.

The non-inverting input terminal (+) of the hysteresis comparator CMP5 is connected to the terminal to which the first AC voltage VAC1 is applied. The inverting input terminal (−) of the hysteresis comparator CMP5 is connected to the terminal to which the DC voltage VDC is applied. The hysteresis comparator CMP5 compares the first AC voltage VAC1 with a first threshold voltage (VDC+Y1), which is higher than the DC voltage VDC by a first offset voltage Y1, and with a second threshold voltage (VDC+Y2), which is higher than the DC voltage VDC by a second offset voltage Y2 (where Y2<Y1), in order to switch the logic level of the first detection signal DET1. Specifically, when the first AC voltage VAC1 increases over the first threshold voltage (VDC+Y1), the hysteresis comparator CMP5 turns the first detection signal DET1 to high level; when the first AC voltage VAC1 decreases under the second threshold voltage (VDC+Y2), the hysteresis comparator CMP5 turns the first detection signal DET1 to low level.

The non-inverting input terminal (+) of the hysteresis comparator CMP6 is connected to the terminal to which the second AC voltage VAC2 is applied. The inverting input terminal (−) of the hysteresis comparator CMP6 is connected to the terminal to which the DC voltage VDC is applied. The hysteresis comparator CMP6 compares the second AC voltage VAC2 with the first threshold voltage (VDC+Y1) and with the second threshold voltage (VDC+Y2), both mentioned above, in order to switch the logic level of the second detection signal DET2. Specifically, when the second AC voltage VAC2 increases over the first threshold voltage (VDC+X1), the hysteresis comparator CMP6 turns the second detection signal DET2 to high level; when the second AC voltage VAC2 decreases under the second threshold voltage (VDC+Y2), the hysteresis comparator CMP6 turns the second detection signal DET2 to low level.

Preferably, the first offset voltage Y1 is set at a voltage level commensurate with the on-state resistance of the transistors M1 and M2 multiplied by the output current I, for example within the range from 5 mV to several tens of mV. Preferably, the second offset voltage Y2 is set within the range from 0 to Y1.

The logic levels of the first and second detection signals DET1 and DET2 are in no way limited to, but may instead be just the opposite to, those specifically described above in terms of high and low levels.

As described above, the comparison circuits 125 and 126 have the configuration of the comparison circuits 121 and 122 minus the comparators CMP1b and CMP2b. Adopting this configuration helps reduce the circuit scale of the switching rectifier circuit. Moreover, setting the first offset voltage Y1 lower than the first offset voltage X1 mentioned previously helps secure a larger margin in the withstand voltage of the switching rectifier circuit. Moreover, setting the first offset voltage Y1 lower than the first offset voltage X1 mentioned previously also helps shift forward the turning-on timing of the transistors M1 and M2 for increased power efficiency.

The configuration and operation of the comparison circuit 123 are similar to those in the first embodiment described previously. Specifically, when the first AC voltage VAC1 decreases under the third threshold voltage (VDC−Y3), the comparison circuit 123 turns the third detection signal DET3 to high level; when the first AC voltage VAC1 increases over the fourth threshold voltage (VSS+Y4), the comparison circuit 123 turns the third detection signal DET3 to low level.

Likewise, the configuration and operation of the comparison circuit 124 are similar to those in the first embodiment described previously. Specifically, when the second AC voltage VAC2 decreases under the third threshold voltage (VDC−Y3), the comparison circuit 124 turns the fourth detection signal DET4 to high level; when the second AC voltage VAC2 increases over the fourth threshold voltage (VSS+Y4), the comparison circuit 124 turns the fourth detection signal DET4 to low level.

Preferably, the third offset voltage Y3 is set within the range from 0.1 V to 0.4 V (lower than the on threshold voltage of the body diodes D3 and D4). Preferably, the fourth offset voltage Y4 is set within the range from VSS (0 V) to VDC.

The logic levels of the third and fourth detection signals DET3 and DET4 are in no way limited to, but may instead be just the opposite to, those specifically described above in terms of high and low levels.

<A Sixth Switching Rectification Operation>

Figure 15:
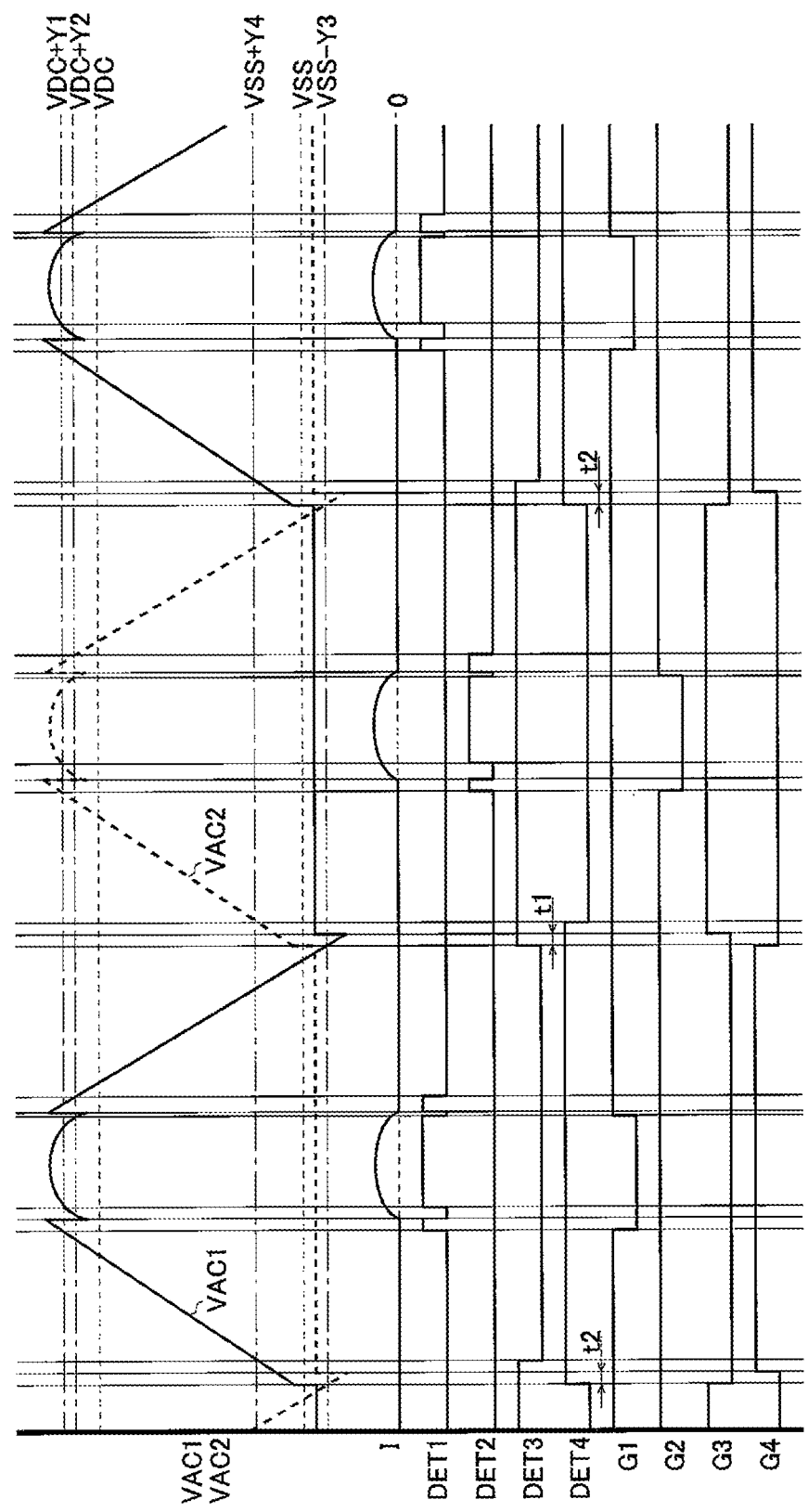
FIG. 15 is a timing chart showing a sixth switching rectification operation.

FIG. 15 is a timing chart showing a sixth switching rectification operation, and shows plots of, from top down, the first and second AC voltages VAC1 and VAC2, the output current I, the first detection signal DET1, the second detection signal DET2, the third detection signal DET3, the fourth detection signal DET4, and the gate signals G1 to G4. The sixth switching rectification operation may be implemented by use of the switching rectifier circuit according to the fourth embodiment (see FIG. 13).

With respect to the turning on and off of the transistor M1, the timing generator 13 operates as follows. When the first AC voltage VAC1 increases over the first threshold voltage (VDC+Y1) and the first detection voltage DET1 turns to high level, the timing generator 13 turns the gate signal G1 to low level and turns on the transistor M1. When the first AC voltage VAC1 decreases under the second threshold voltage (VDC+Y2) and the first detection signal DET1 turns to low level, the timing generator 13 turns the gate signal G1 to high level and turns off the transistor M1.

Likewise, with respect to the turning on and off of the transistor M2, the timing generator 13 operates as follows. When the second AC voltage VAC2 increases over the first threshold voltage (VDC+Y1) and the second detection voltage DET2 turns to high level, the timing generator 13 turns the gate signal G2 to low level and turns on the transistor M2. When the second AC voltage VAC2 decreases under the second threshold voltage (VDC+Y2) and the second detection signal DET2 turns to low level, the timing generator 13 turns the gate signal G2 to high level and turns off the transistor M2.

Inconveniently, when the first AC voltage VAC1 (or the second AC voltage VAC2) increases over the first threshold voltage (VDC+Y1) and the transistor M1 (or M2) is turned on, the first AC voltage VAC1 (or the second AC voltage VAC2) drops to close to the DC voltage VDC and momentarily decreases under the second threshold voltage (VDC+Y2). Thus, immediately after the transistor M1 (or M2) is turned on, the first detection signal DET1 (or the second detection signal DET2) turns to low level unexpectedly.

To avoid that, the timing generator 13 is configured to ignore a momentary drop in the first and second AC voltage VAC1 and VAC2 under the second threshold voltage (VDC+Y2) when turning on the transistors M1 and M2 respectively. For example, the timing generator 13 may be configured to ignore the first detection signal DET1 (or the second detection signal DET2) for a predetermined masking period after the first detection signal DET1 (or the second detection signal DET2) has turned to high level, or may be configured to detect the second low edge that occurs in the first detection signal DET1 (or the second detection signal DET2) after the first detection signal DET1 (or the second detection signal DET2) has turned to high level.

With this configuration, it is possible to prevent the transistor M1 (or M2) from being turned off unnecessarily by being triggered by an unexpected low edge in the first detection signal DET1 (or the second detection signal DET2).

With respect to the turning on and off of the transistor M3, the timing generator 13 operates as follows. A first wait time t1 after the first AC voltage VAC1 has decreased under the third threshold voltage (VSS−Y3) and the third detection signal DET3 has turned to high level, the timing generator 13 turns the gate signal G3 to high level and turns on the transistor M3. When the second AC voltage VAC2 decreases under the third threshold voltage (VSS−Y3) and the fourth detection signal DET4 turns to high level, the timing generator 13 turns the gate signal G3 to low level and turns off the transistor M3.

Likewise, with respect to the turning on and off of the transistor M4, the timing generator 13 operates as follows. A second wait time t2 after the second AC voltage VAC2 has decreased under the third threshold voltage (VSS−Y3) and the fourth detection signal DET4 has turned to high level, then, the timing generator 13 turns the gate signal G4 to high level and turns on the transistor M4. When the first AC voltage VAC1 decreases under the third threshold voltage (VSS−Y3) and the third detection signal DET3 turns to high level, the timing generator 13 turns the gate signal G4 to low level and turns off the transistor M4.

With this configuration where the transistor M3 is turned on the first wait time t1 after the transistor M4 has been turned off and the transistor M4 is turned off the second wait time t2 after the transistor M3 has been turned off, it is possible to reliably prevent the transistors M3 and M4 from turning on simultaneously. The first and second wait time t1 and t2 may be equal or different.

With the switching rectification operation described above, it is possible, with minimal operation of the body diodes D1 to D4 parasitic to the transistors M1 to M4, to reliably prevent a reverse flow of the output current I, and this helps increase the power conversion efficiency of the switching rectifier circuit.

<Embodiment 5>

Figure 16:
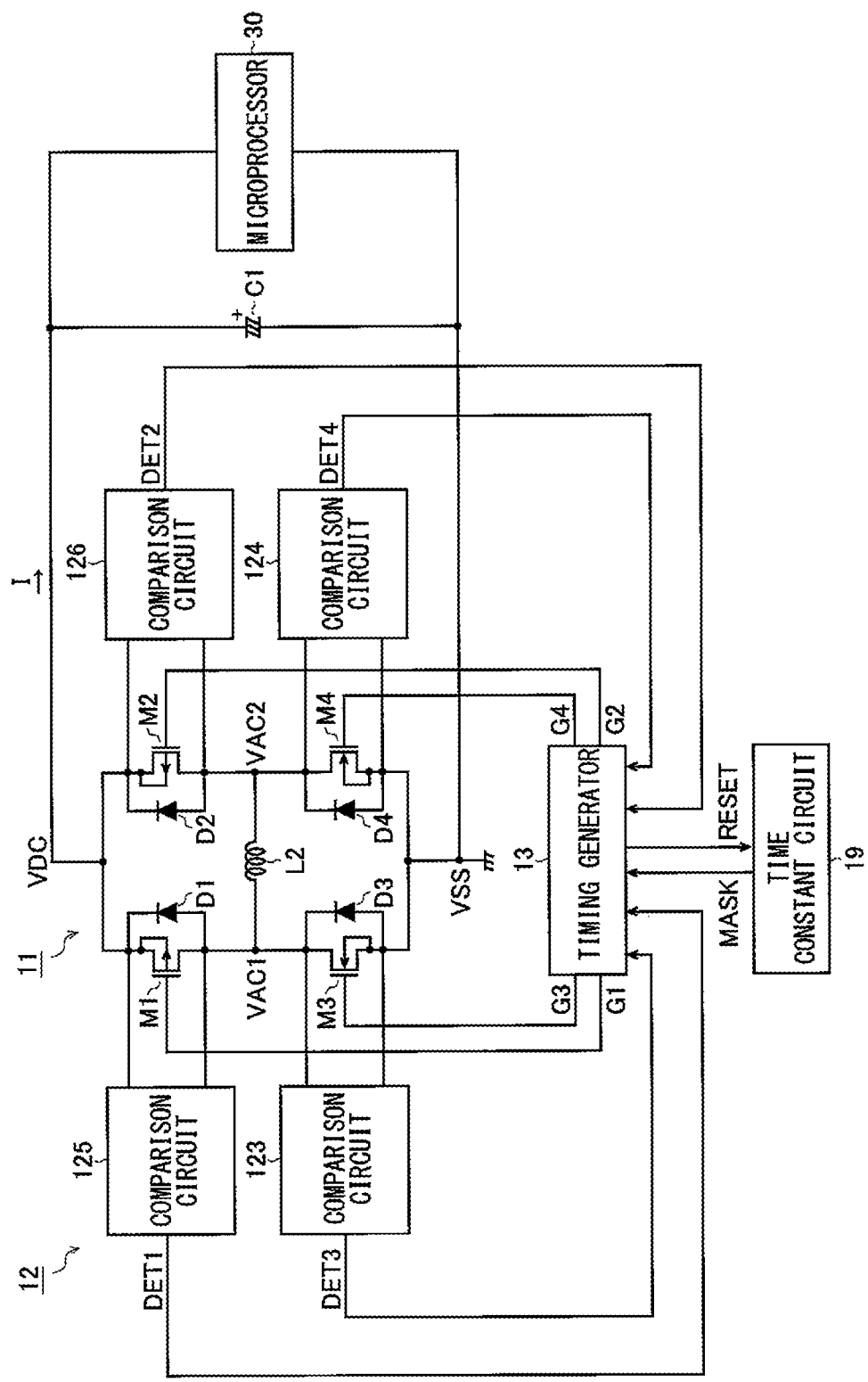
FIG. 16 is a circuit diagram showing a switching rectifier circuit according to a fifth embodiment of the invention.
Figure 17:
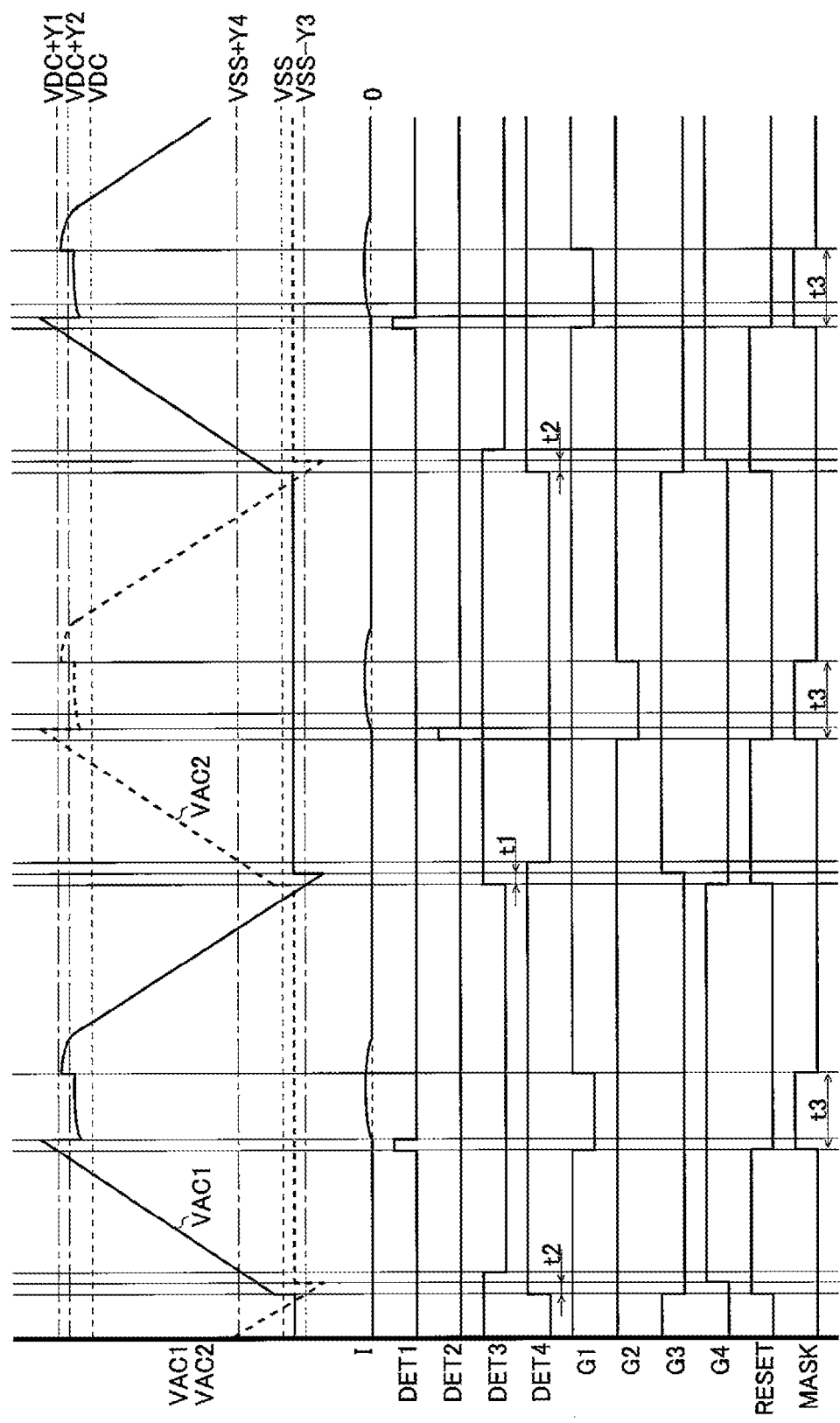
FIG. 17 is a timing chart showing a seventh switching rectification operation.

FIG. 16 is a circuit diagram showing a switching rectifier circuit according to a fifth embodiment of the invention, and FIG. 17 is a timing chart showing a seventh switching rectification operation. As shown in FIG. 16, the switching rectifier circuit according to the fifth embodiment has largely the same configuration as the one according to the fourth embodiment described previously, and is characterized by the addition of a time constant circuit 19. Accordingly, such circuit elements as find their counterparts in the first embodiment are identified by the same reference signs as in FIG. 3 to omit overlapping description, and given below will be a detailed description of the significance of the addition of the time constant circuit 19 and its operation.

In a case where the output current I is sufficiently large (for example, when the output current I is set for a 500 mA mode), no problem occurs. In a case where the output current I is small (for example, when the output current I is set for a 100 mA mode), as shown in FIG. 17, after the transistor M1 (or M2) is turned on, the first AC voltage VAC1 (or the second AC voltage VAC2) may fail to reach the second threshold voltage (VDC+Y2), making it impossible to detect the turning-off timing of the transistor M1 (or M2).

To avoid that, the switching rectifier circuit according to this embodiment is provided with the time constant circuit 19 as a means of forcibly turning the transistor M1 (or M2) off when a predetermined time t3 elapses after the first or second AC voltage VAC1 or VAC2 has increased over the first threshold voltage (VDC+Y1), regardless of the first detection signal DET1 (or the second detection signal DET2).

At the same time that a reset signal RESET fed from the timing generator 13 is turned to low level, the time constant circuit 19 turns a mask signal MASK to high level, and when the predetermined time t3 elapses thereafter, the time constant circuit 19 turns the mask signal MASK to low level.

The reset signal RESET is turned to high level at a rising edge in the third and fourth detection signals DET3 and DET4, and is turned to low level at a rising edge in the first and second detection signals DET1 and DET2.

The mask signal MASK is used, in the timing generator 13, as a signal for forcibly keeping the transistor M1 (or M2) on for the predetermined time t3. In other words, the mask signal MASK is used as a signal (an enable signal for securing the minimum on period of the transistor M1 (or M2)) for ignoring an unexpected falling edge in the first detection signal DET1 (or the second detection signal DET2) that occurs when the transistors M1 and M2, respectively, are turned on.

The predetermined time t3 may be counted by an analog time counting method using a capacitor and a constant current source, or by a digital time counting method using a clock counter.

<A Seventh Switching Rectification Operation>

Based on the outputs (the first detection signal DET1, the second detection signal DET2, the third detection signal DET3, the fourth detection signal DET4, and the mask signal MASK) of the comparison circuits 123 to 126 and of the time constant circuit 19, the timing generator 13 generates the gate signals G1 to G4 to turn the transistors M1 to M4 on and off.

Specifically, with respect to the turning on and off of the transistor M1, the timing generator 13 operates as follows. When the first AC voltage VAC1 increases over the first threshold voltage (VDC+Y1) and the first detection voltage DET1 turns to high level, the timing generator 13 turns the gate signal G1 to low level and turns on the transistor M1. When the first AC voltage VAC1 decreases under the second threshold voltage (VDC+Y2) and the first detection signal DET1 turns to low level, or when the mask signal MASK turns to low level the predetermined time t3 after the first AC voltage VAC1 has increased over the first threshold voltage (VDC+Y1), the timing generator 13 turns the gate signal G1 to high level and turns off the transistor M1.

Likewise, with respect to the turning on and off of the transistor M2, the timing generator 13 operates as follows. When the second AC voltage VAC2 increases over the first threshold voltage (VDC+Y1) and the second detection voltage DET2 turns to high level, the timing generator 13 turns the gate signal G2 to low level and turns on the transistor M2. When the second AC voltage VAC2 decreases under the second threshold voltage (VDC+Y2) and the second detection signal DET2 turns to low level, or when the mask signal MASK turns to low level the predetermined time t3 after the second AC voltage VAC2 has increased over the first threshold voltage (VDC+Y1), the timing generator 13 turns the gate signal G2 to high level and turns off the transistor M2.

The turning on and off of the transistors M3 and M4 is handled in a similar manner as in the fourth embodiment described previously (the sixth switching rectification operation (FIG. 15)), and therefore no overlapping description will be repeated.

With this configuration, even if, after the transistor M1 (or M2) is turned on, the first AC voltage VAC1 (or the second AC voltage VAC2) does not reach the second threshold voltage (VDC+Y2), regardless of the first detection signal DET1 (or the second detection signal DET2), it is possible, by using the mask signal MASK, to forcibly turn the transistor M1 (or M2) off. It is thus possible to prevent a reverse flow of the output current I.

It is also possible, by using the mask signal MASK, to ignore an unexpected falling edge in the first detection signal DET1 (or the second detection signal DET2) that occurs when the transistors M1 and M2, respectively, are turned on. It is thus possible to secure the minimum on period of the transistor M1 (or M2).

It is preferable that the predetermined time t3 above be controlled to vary so as to be the shorter the higher the voltage level of the DC voltage VDC. This configuration is usable in applications where the DC voltage VDC varies (as in battery chargers). Depending on the application, however, it may be preferable that the predetermined time t3 not vary; accordingly, it is preferable to choose whether to control and vary the predetermined time t3 or keep it at a constant length to suit the situation.

<An Eighth Switching Rectification Operation>

Figure 18:
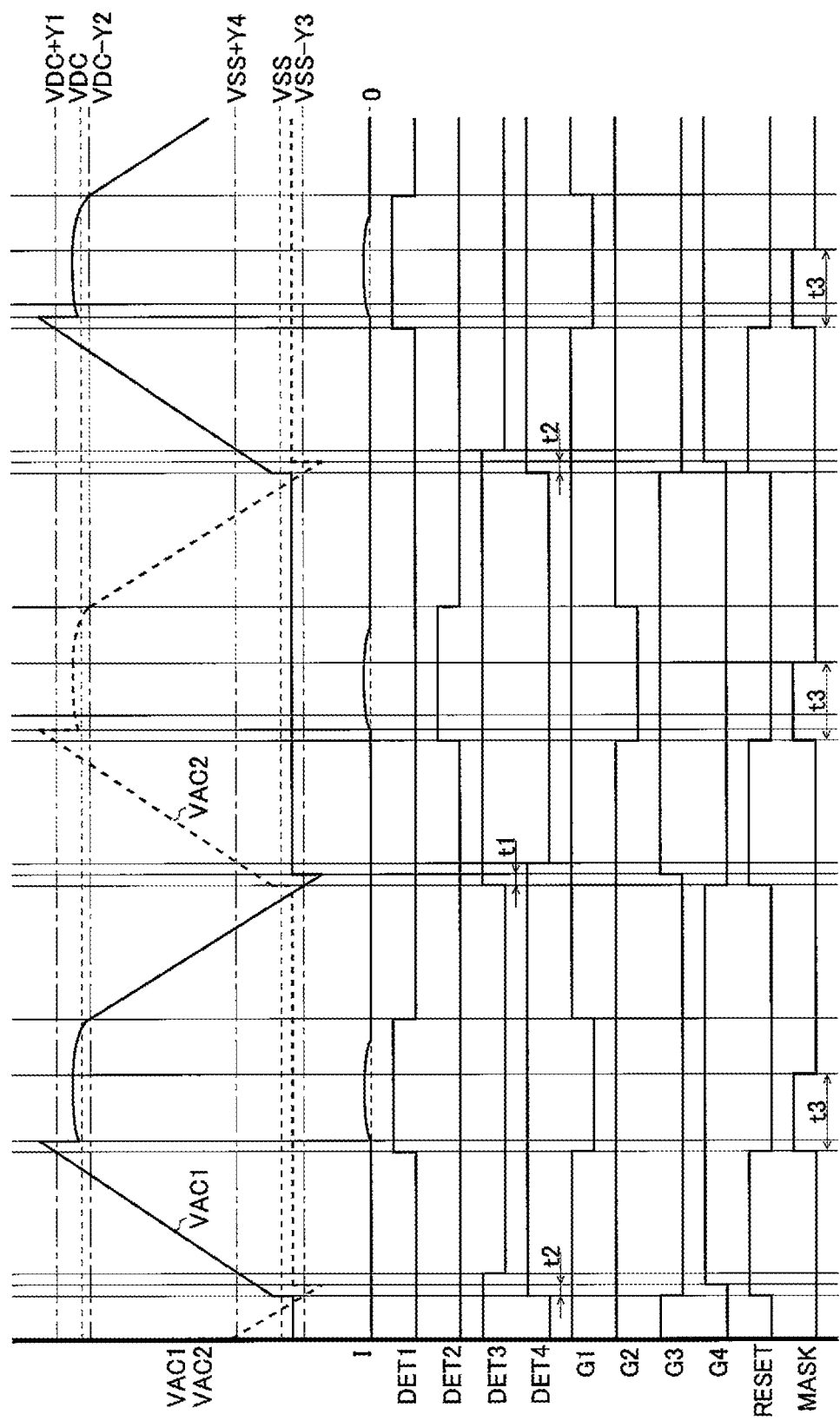
FIG. 18 is a timing chart showing an eighth switching rectification operation.
Figure 19:
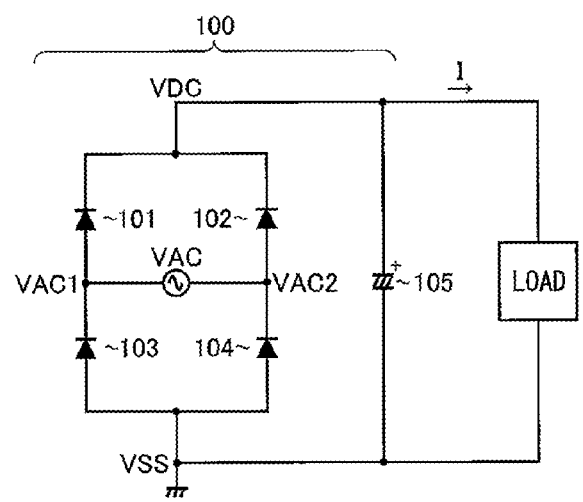
FIG. 19 is a circuit diagram showing a first conventional example of a rectification circuit.
Figure 20:
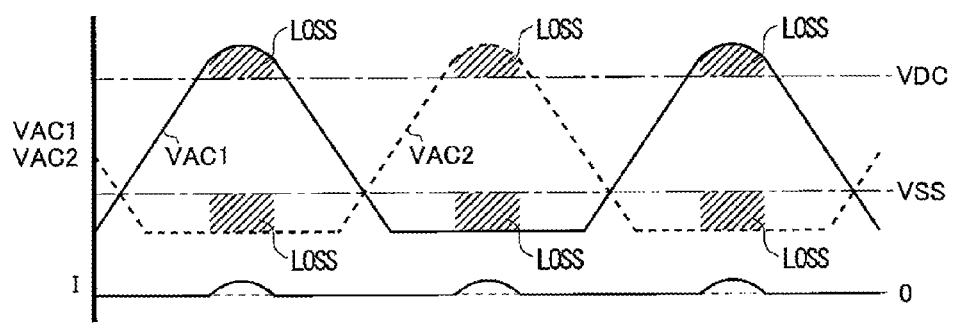
FIG. 20 is a timing chart showing how energy loss occurs.
Figure 21:
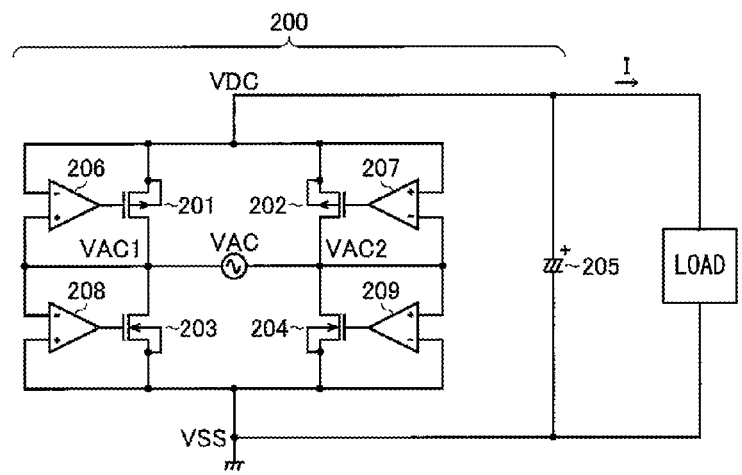
FIG. 21 is a circuit diagram showing a second conventional example of a rectification circuit.
Figure 22:
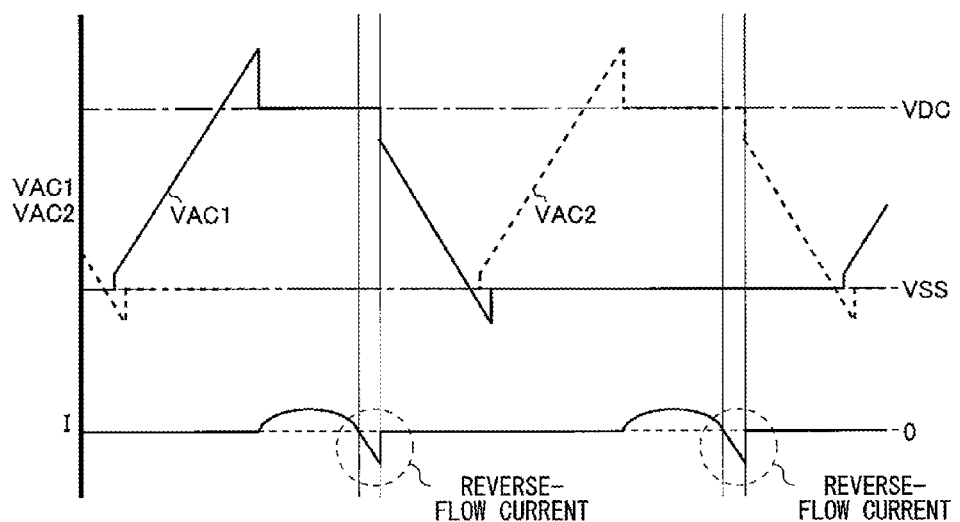
FIG. 22 is a timing chart showing how a reverse-flow current occurs.

FIG. 18 is a timing chart showing an eighth switching rectification operation. The eighth switching rectification operation can be considered to derive from the seventh switching rectification operation described previously in that it is implemented by use of the switching rectifier circuit according to the fifth embodiment (see FIG. 16).

A difference from the seventh switching rectification operation is that, in the comparison circuits 125 and 126, there are set a first threshold voltage (VDC+Y1), which is higher than the DC voltage VDC, and a second threshold voltage (VDC−Y2), which is lower than the DC voltage VDC.

Also in the eighth switching rectification operation, based on the outputs (the first detection signal DET1, the second detection signal DET2, the third detection signal DET3, the fourth detection signal DET4, and the mask signal MASK) of the comparison circuits 123 to 126 and of the time constant circuit 19, the timing generator 13 generates the gate signals G1 to G4 to turn the transistors M1 to M4 on and off.

Specifically, with respect to the turning on and off of the transistor M1, the timing generator 13 operates as follows. When the first AC voltage VAC1 increases over the first threshold voltage (VDC+Y1) and the first detection voltage DET1 turns to high level, the timing generator 13 turns the gate signal G1 to low level and turns on the transistor M1. When the first AC voltage VAC1 decreases under the second threshold voltage (VDC−Y2), the timing generator 13 turns the gate signal G1 to high level and turns off the transistor M1.

Likewise, with respect to the turning on and off of the transistor M2, the timing generator 13 operates as follows. When the second AC voltage VAC2 increases over the first threshold voltage (VDC+Y1) and the second detection voltage DET2 turns to high level, the timing generator 13 turns the gate signal G2 to low level and turns on the transistor M2. When the second AC voltage VAC2 decreases under the second threshold voltage (VDC−Y2), the timing generator 13 turns the gate signal G2 to high level and turns off the transistor M2.

With this configuration, even if, after the transistor M1 (or M2) is turned on, the first AC voltage VAC1 (or the second AC voltage VAC2) does not rise sufficiently, when it decreases under the second threshold voltage (VDC−Y2) lower than the DC voltage VDC, it is possible to turn off the transistor M1 (or M2) properly. It is thus possible to maintain synchronous rectification operation even with a small output current I.

As with the seventh switching rectification operation, is also possible, by using the mask signal MASK, to ignore an unexpected falling edge in the first detection signal DET1 (or the second detection signal DET2) that occurs when the transistors M1 and M2, respectively, are turned on. It is thus possible to secure the minimum on period of the transistor M1 (or M2).

<Modified Examples>

Although the embodiments described above deal with, as examples, configurations where the present invention is applied to a battery charger employing a switching rectification circuit, this is not meant to limit the application of the invention to such purposes. The invention finds applications in switching rectification circuits in general that are used for many other purposes.

The invention may be implemented in any manners other than specifically described by way of embodiments above, with many modifications and variations made within the spirit of the invention. That is, the embodiments described above are to be considered in every way exemplary and not restrictive. The technical scope of the invention is defined not by the description of the embodiments given above but by the scope of the appended claims, and is to be understood to encompass any modifications and variations in the sense and scope equivalent to those of the claims.

For example, although the embodiments described above deal with, as examples, configurations where P-channel MOS field-effect transistors are used as the upper-tier transistors in the H bridge 11, this is not meant to limit the configuration of the invention; N-channel MOS field-effect transistors may instead be used. When such a configuration is adopted, the gate signals G1 and G2 are given the opposite logic levels.

INDUSTRIAL APPLICABILITY

The present invention is a technology useful in increasing the power conversion efficiency of, for example, switching rectifier circuits incorporated in battery chargers.

LIST OF REFERENCE SIGNS 1 battery charger
2 commercial AC power source
3 battery cell
10 switching rectifier IC (switching rectifier circuit)
11 H bridge
12 discriminator
121-124 comparison circuit
125, 126 comparison circuit
13 timing generator
14 undervoltage detector (UVLO)
15 protection circuit
16 overvoltage detector (OVP)
17 abnormal temperature detector (TSD)
18 switch
19 time constant circuit
20 transformer
30 microprocessor
40 load modulator
M1, M2 P-channel MOS field-effect transistor
M3, M4 N-channel MOS field-effect transistor
L1, L2 coil (primary, secondary)
C1 output capacitor
D1-D4 body diode
CMP1$a$, CMP2$a$, CMP3, CMP4 hysteresis comparator
CMP5, CMP6 hysteresis comparator
CMP1$b$, CMP2$b$ comparator

The invention claimed is:

1. A switching rectification circuit, comprising:
a first switch connected between a terminal to which a first AC voltage is applied and a terminal to which a DC voltage is applied;
a second switch connected between a terminal to which a second AC voltage is applied and the terminal to which the DC voltage is applied;
a third switch connected between the terminal to which the first AC voltage is applied and a terminal to which a reference voltage is applied;
a fourth switch connected between the terminal to which the second AC voltage is applied and the terminal to which the reference voltage is applied;
a first comparison circuit adapted to generate from the first AC voltage and the DC voltage a first on detection signal and a first off detection signal individually;
a second comparison circuit adapted to generate from the second AC voltage and the DC voltage a second on detection signal and a second off detection signal individually; and
a timing generator adapted to control turning on and off of the first to fourth switches based on at least outputs of the first and second comparison circuits, wherein
the first comparison circuit comprises:
a first hysteresis comparator adapted to
 turn the first on detection signal to high level or low level when the first AC voltage increases over a first threshold voltage higher than the DC voltage and
 turn the first on detection signal to low level or high level when the first AC voltage decreases under a third threshold voltage lower than the DC voltage; and
a first comparator adapted to
 turn the first off detection signal to high level or low level when the first AC voltage increases over a second threshold voltage higher than the DC voltage but lower than the first threshold voltage and
 turn the first off detection signal to low level or high level when the first AC voltage decreases under the second threshold voltage, and the second comparison circuit comprises:
a second hysteresis comparator adapted to
turn the second on detection signal to high level or low level when the second AC voltage increases over the first threshold voltage and
turn the second on detection signal to low level or high level when the second AC voltage decreases under the third threshold voltage; and
a second comparator adapted to
turn the second off detection signal to high level or low level when the second AC voltage increases over the second threshold and
turn the second off detection signal to low level or high level when the second AC voltage decreases under the second threshold voltage.

2. The switching rectifier circuit according to claim 1, further comprising:
a third comparison circuit adapted to generate from the first AC voltage and the reference voltage a third detection signal; and
a fourth comparison circuit adapted to generate from the second AC voltage and the reference voltage a fourth detection signal, wherein
the timing generator is adapted to control the turning on and off of the first to fourth switches based on at least outputs of the first to fourth comparison circuits.

3. The switching rectifier circuit according to claim 2, wherein the third comparison circuit comprises a third hysteresis comparator adapted to
turn the third detection signal to high level or low level when the first AC voltage decreases under a fourth threshold voltage lower than the reference voltage and
turn the third detection signal to low level or high level when the first AC voltage increases over a fifth threshold voltage higher than the reference voltage, and the fourth comparison circuit comprises a fourth hysteresis comparator adapted to
turn the fourth detection signal to high level or low level when the second AC voltage decreases under the fourth threshold voltage and
turn the fourth detection signal to low level or high level when the second AC voltage increases over the fifth threshold voltage.

4. The switching rectifier circuit according to claim 3, further comprising a time constant circuit adapted to generate an enable signal which remains at high level or low level after the first or second AC voltage increases over the first threshold voltage until a predetermined time elapses, wherein
the timing generator is adapted to control the turning on and off of the first to fourth switches based on at least outputs of the first to fourth comparison circuits and of the time constant circuit.

5. The switching rectifier circuit according to claim 4, wherein the predetermined time is controlled to vary so as to be the shorter the higher a voltage level of the DC voltage is.

6. The switching rectifier circuit according to claim 4, wherein the timing generator is adapted to
generate the first on and off control signals so as to turn on the first switch when the first AC voltage increases over the first threshold voltage and turn off the first switch when the first AC voltage decreases under the second threshold voltage or a predetermined time after the first AC voltage has increased over the first threshold voltage,
generate the second on and off control signals so as to turn on the second switch when the second AC voltage increases over the first threshold voltage and turn off the second switch when the second AC voltage decreases under the second threshold voltage or a predetermined time after the second AC voltage has increased over the first threshold voltage,
generate the third on and off control signals so as to turn on the third switch a first wait time after the first AC voltage decreases under the fourth threshold voltage and turn off the third switch when the second AC voltage decreases under the fourth threshold voltage, and
generate the fourth on and off control signals so as to turn on the fourth switch a second wait time after the second AC voltage decreases under the fourth threshold voltage and turn off the fourth switch when the first AC voltage decreases under the fourth threshold voltage.

7. The switching rectifier circuit according to claim 3, wherein the timing generator is adapted to
generate the first on and off control signals so as to turn on the first switch when the first AC voltage increases over the first threshold voltage and turn off the first switch when the first AC voltage decreases under the second threshold voltage,
generate the second on and off control signals so as to turn on the second switch when the second AC voltage increases over the first threshold voltage and turn off the second switch when the second AC voltage decreases under the second threshold voltage,
generate the third on and off control signals so as to turn on the third switch a first wait time after the first AC voltage decreases under the fourth threshold voltage and turn off the third switch when the second AC voltage decreases under the fourth threshold voltage, and
generate the fourth on and off control signals so as to turn on the fourth switch a second wait time after the second AC voltage decreases under the fourth threshold voltage and turn off the fourth switch when the first AC voltage decreases under the fourth threshold voltage.

8. The switching rectifier circuit according to claim 7, wherein the timing generator ignores a drop in the first and second AC voltages under the second threshold voltage when turning on the first and second switches respectively.

9. The switching rectifier circuit according to claim 3, wherein the timing generator is adapted to
generate the first on and off control signals so as to turn on the first switch when the first AC voltage increases over the first threshold voltage and turn off the first switch when the first AC voltage decreases under the second threshold voltage,
generate the second on and off control signals so as to turn on the second switch when the second AC voltage increases over the first threshold voltage and turn off the second switch when the second AC voltage decreases under the second threshold voltage,
generate the third on and off control signals so as to turn on the third switch when the first AC voltage decreases under the fourth threshold voltage and turn off the third switch when the second AC voltage decreases under the second threshold voltage, and
generate the fourth on and off control signals so as to turn on the fourth switch when the second AC voltage decreases under the fourth threshold voltage and turn off the fourth switch when the first AC voltage decreases under the second threshold voltage.

10. The switching rectifier circuit according to claim 3, wherein the timing generator is adapted to
generate the first on and off control signals so as to turn on the first switch when the first AC voltage increases over the first threshold voltage and turn off the first switch when the first AC voltage decreases under the second threshold voltage,
  generate the second on and off control signals so as to turn on the second switch when the second AC voltage increases over the first threshold voltage and turn off the second switch when the second AC voltage decreases under the second threshold voltage,
  generate the third on and off control signals so as to turn on the third switch when the second AC voltage increases over the first threshold voltage and turn off the third switch when the second AC voltage decreases under the fourth threshold voltage, and
  generate the fourth on and off control signals so as to turn on the fourth switch when the first AC voltage increases over the first threshold voltage and turn off the fourth switch when the first AC voltage decreases under the fourth threshold voltage.

11. The switching rectifier circuit according to claim 1, wherein the timing generator is adapted to
  generate the first and fourth on and off control signals so as to turn on both the first and fourth switches when the first AC voltage increases over the first threshold voltage and turn off both the first and fourth switches when the first AC voltage decreases under the second threshold voltage, and
  generate the second and third on and off control signals so as to turn on both the second and third switches when the second AC voltage increases over the first threshold voltage and turn off both the second and third switches when the second AC voltage decreases under the second threshold voltage.

12. The switching rectifier circuit according to claim 1, wherein the first to fourth switches are all field-effect transistors.

13. The switching rectifier circuit according to claim 12, wherein the timing generator is adapted to
  keep the first to fourth switches all off until the DC voltage reaches a predetermined level and
  rectify the AC voltages into the DC voltage through rectification operation using body diodes of the first to fourth switches respectively.

14. A switching rectification circuit, comprising:
  a first switch connected between a terminal to which a first AC voltage is applied and a terminal to which a DC voltage is applied;
  a second switch connected between a terminal to which a second AC voltage is applied and the terminal to which the DC voltage is applied;
  a third switch connected between the terminal to which the first AC voltage is applied and a terminal to which a reference voltage is applied;
  a fourth switch connected between the terminal to which the second AC voltage is applied and the terminal to which the reference voltage is applied;
  a first comparison circuit adapted to generate from the first AC voltage and the DC voltage a first detection signal;
  a second comparison circuit adapted to generate from the second AC voltage and the DC voltage a second detection signal;
  a third comparison circuit adapted to generate from the first AC voltage and the reference voltage a third detection signal;
  a fourth comparison circuit adapted to generate from the second AC voltage and the reference voltage a fourth detection signal; and
  a timing generator adapted to control turning on and off of the first to fourth switches based on at least outputs of the first to fourth comparison circuits, wherein
  the first comparison circuit comprises a first hysteresis comparator adapted to
    turn the first detection signal to high level or low level when the first AC voltage increases over a first threshold voltage higher than the DC voltage and
    turn the first detection signal to low level or high level when the first AC voltage decreases under a second threshold voltage higher than the DC voltage but lower than the first threshold voltage,
  the second comparison circuit comprises a second hysteresis comparator adapted to
    turn the second detection signal to high level or low level when the second AC voltage increases over the first threshold voltage and
    turn the second detection signal to low level or high level when the second AC voltage decreases under the second threshold voltage,
  the third comparison circuit comprises a third hysteresis comparator adapted to
    turn the third detection signal to high level or low level when the first AC voltage decreases under a third threshold voltage lower than the reference voltage and
    turn the third detection signal to low level or high level when the first AC voltage increases over a fourth threshold voltage higher than the reference voltage, and
  the fourth comparison circuit comprises a fourth hysteresis comparator adapted to
    turn the fourth detection signal to high level or low level when the second AC voltage decreases under the third threshold voltage and
    turn the fourth detection signal to low level or high level when the second AC voltage increases over the fourth threshold voltage.

15. The switching rectifier circuit according to claim 14, wherein
  the first comparison circuit comprises a first hysteresis comparator adapted to
    turn the first detection signal to high level or low level when the first AC voltage increases over a first threshold voltage higher than the DC voltage and
    turn the first detection signal to low level or high level when the first AC voltage decreases under a second threshold voltage lower than the DC voltage,
  the second comparison circuit comprises a second hysteresis comparator adapted to
    turn the second detection signal to high level or low level when the second AC voltage increases over the first threshold voltage and
    turn the second detection signal to low level or high level when the second AC voltage decreases under the second threshold voltage,
  the third comparison circuit comprises a third hysteresis comparator adapted to
    turn the third detection signal to high level or low level when the first AC voltage decreases under a third threshold voltage lower than the reference voltage and
    turn the third detection signal to low level or high level when the first AC voltage increases over a fourth threshold voltage higher than the reference voltage, and
  the fourth comparison circuit comprises a fourth hysteresis comparator adapted to turn the fourth detection signal to high level or low level when the second AC voltage decreases under the third threshold voltage and turn the fourth detection signal to low level or high level when the second AC voltage increases over the fourth threshold voltage.

16. The switching rectifier circuit according to claim 15, further comprising a time constant circuit adapted to generate a mask signal which remains at high level or low level after the first or second AC voltage increases over the first threshold voltage until a predetermined time elapses, wherein the timing generator is adapted to control the turning on and off of the first to fourth switches based on at least outputs of the first to fourth comparison circuits and of the time constant circuit.

17. The switching rectifier circuit according to claim 16, wherein the timing generator is adapted to generate the first on and off control signals so as to turn on the first switch when the first AC voltage increases over the first threshold voltage and turn off the first switch when the first AC voltage decreases under the second threshold voltage or a predetermined time after the first AC voltage has increased over the first threshold voltage, generate the second on and off control signals so as to turn on the second switch when the second AC voltage increases over the first threshold voltage and turn off the second switch when the second AC voltage decreases under the second threshold voltage or a predetermined time after the second AC voltage has increased over the first threshold voltage, generate the third on and off control signals so as to turn on the third switch a first wait time after the first AC voltage decreases under the third threshold voltage and turn off the third switch when the second AC voltage decreases under the third threshold voltage, and generate the fourth on and off control signals so as to turn on the fourth switch a second wait time after the second AC voltage decreases under the third threshold voltage and turn off the fourth switch when the first AC voltage decreases under the third threshold voltage.

18. The switching rectifier circuit according to claim 14, wherein the timing generator is adapted to generate the first on and off control signals so as to turn on the first switch when the first AC voltage increases over the first threshold voltage and turn off the first switch when the first AC voltage decreases under the second threshold voltage, generate the second on and off control signals so as to turn on the second switch when the second AC voltage increases over the first threshold voltage and turn off the second switch when the second AC voltage decreases under the second threshold voltage, generate the third on and off control signals so as to turn on the third switch a first wait time after the first AC voltage decreases under the third threshold voltage and turn off the third switch when the second AC voltage decreases under the third threshold voltage, and generate the fourth on and off control signals so as to turn on the fourth switch a second wait time after the second AC voltage decreases under the third threshold voltage and turn off the fourth switch when the first AC voltage decreases under the third threshold voltage.

* * * * *